US012687667B2

(12) United States Patent
   Deng

(10) Patent No.: US 12,687,667 B2
(45) Date of Patent: Jul. 21, 2026

(54) COMPOSITE GRATING AND MANUFACTURING METHOD THEREOF, DIFFRACTION OPTICAL WAVEGUIDE, AND ELECTRONIC DEVICE

(71) Applicant: Huawei Technologies Co., Ltd., Shenzhen (CN)

(72) Inventor: Zhuoyong Deng, Dongguan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 331 days.

(21) Appl. No.: 18/259,704

(22) PCT Filed: Dec. 17, 2021

(86) PCT No.: PCT/CN2021/139214
§ 371 (c)(1),
(2) Date: Jun. 28, 2023

(87) PCT Pub. No.: WO2022/143227
PCT Pub. Date: Jul. 7, 2022

(65) Prior Publication Data
US 2024/0069256 A1 Feb. 29, 2024

(30) Foreign Application Priority Data
Dec. 29, 2020 (CN) .......................... 202011608310.3

(51) Int. Cl.
*G02B 5/18* (2006.01)
*G02B 27/01* (2006.01)
(52) U.S. Cl.
CPC ....... *G02B 5/1819* (2013.01); *G02B 27/0172* (2013.01); *G02B 2027/0178* (2013.01)

(58) Field of Classification Search
CPC .............. G02B 5/1819; G02B 27/0172; G02B 2027/0178; G02B 5/1857; G02B 5/1814; G02B 5/1847; G02B 6/00; G02B 6/10
See application file for complete search history.

(56) References Cited

U.S. PATENT DOCUMENTS

2003/0231396 A1* 12/2003 Nakai ................ G02B 27/0056
359/569
2019/0025605 A1 1/2019 Kuo et al.
(Continued)

FOREIGN PATENT DOCUMENTS

CA 3151575 A1 9/2016
CN 101131537 A 2/2008
(Continued)

OTHER PUBLICATIONS

Jianhua Jiang et al: "Analysis of stacked rotated gratings." Published in Applied Optics, Mar. 10, 2007. total 7 pages.
(Continued)

*Primary Examiner* — Euncha P Cherry
(74) *Attorney, Agent, or Firm* — Slater Matsil, LLP

(57) ABSTRACT
A composite grating includes a first relief structure and a second relief structure, the first relief structure includes a plurality of first slits, the second relief structure includes a plurality of second slits, the second relief structure is stacked on a light incident side of the first relief structure, the second slit faces away from the first relief structure, a surface of the first relief structure that faces away from the second relief structure is a reference plane, and an included angle between a projection, on the reference plane, of an extension direction of the first slit and a projection, on the reference plane, of an extension direction of the second slit is 10 degrees to 90 degrees.

20 Claims, 24 Drawing Sheets

(56) References Cited

U.S. PATENT DOCUMENTS

| | | | |
|---|---|---|---|
| 2020/0158942 A1 | 5/2020 | Yang et al. | |
| 2021/0191025 A1* | 6/2021 | Yang ................... | G02B 6/0065 |

FOREIGN PATENT DOCUMENTS

| | | | |
|---|---|---|---|
| CN | 107144904 | A | 9/2017 |
| CN | 107615136 | A | 1/2018 |
| CN | 108387960 | A | 8/2018 |
| CN | 109283729 | A | 1/2019 |
| CN | 111065941 | A | 4/2020 |
| CN | 108680978 | B | 12/2020 |
| JP | 5339975 | B2 | 11/2013 |
| KR | 100390875 | B1 | 7/2003 |
| WO | 2016075540 | A1 | 5/2016 |

OTHER PUBLICATIONS

Lai Wei-Yu et al: "Analysis of Doubly-Stacked Rotated Gratings Using Asymptotic Corrugations Boundary Conditions", IEEE Transactions on Antennas and Propagation, IEEE, USA, vol. 67, No. 7, Jul. 1, 2019, total 15 pages.

Granet Gerard: "Modal analysis of stacked gratings using B splines basis", 2018 International Applied Computational Electromagnetics Society Symposium (ACES), Applied Computational Electromagnetics Society (ACES), Mar. 25, 2018, total 2 pages.

\* cited by examiner

100

30

30

30

30

30

32

34

31

33

30

32

34

31

33

S210

A first relief structure is formed by a dry etching process

S220

A second relief structure is formed on a light incident side of the first relief
structure to form a composite grating

| | |
|---|---|
| Form a first relief structure | S310 |
| An intermediate layer is formed on a side of the first relief structure that faces away from a substrate | S320 |
| A second relief structure is formed on a light incident side of the first relief structure by a nano-imprint process to form a composite grating | S330 |

COMPOSITE GRATING AND MANUFACTURING METHOD THEREOF, DIFFRACTION OPTICAL WAVEGUIDE, AND ELECTRONIC DEVICE

CROSS-REFERENCE TO RELATED APPLICATIONS

This application is a national stage of International Application No. PCT/CN2021/139214, filed on Dec. 17, 2021, which claims priority to Chinese Patent Application No. 202011608310.3, filed on Dec. 29, 2020. Both of the aforementioned applications are hereby incorporated by reference in their entireties.

TECHNICAL FIELD

This application relates to the field of grating technologies, and in particular, to a composite grating and a manufacturing method thereof, a diffraction optical waveguide, and an electronic device.

BACKGROUND

The enhancement display device performs optical display by using a diffraction optical waveguide. A core element of the diffraction optical waveguide is a grating. The grating is an optical element with a periodic structure, and may divide light into different diffraction orders, to implement large-angle deflection in a light propagation direction. A grating in the conventional technology cannot obtain good optical uniformity and a good imaging effect.

SUMMARY

This application provides a composite grating, a diffraction optical waveguide including the composite grating, and an electronic device including the diffraction optical waveguide. The composite grating has good optical uniformity and a good imaging effect. This application further provides a method for manufacturing a composite grating.

According to a first aspect, a composite grating is provided. The composite grating includes a first relief structure and a second relief structure, the first relief structure includes a plurality of first slits, the second relief structure includes a plurality of second slits, the second relief structure is stacked on a light incident side of the first relief structure, the second slit faces away from the first relief structure, a surface of the first relief structure that faces away from the second relief structure is a reference plane, and an included angle between a projection, on the reference plane, of an extension direction of the first slit and a projection, on the reference plane, of an extension direction of the second slit is 10 degrees to 90 degrees (including 10 degrees and 90 degrees).

It may be understood that, the extension direction of the first slit is an extension direction of the first slit in a length direction, the extension direction of the second slit is an extension direction of the second slit in a length direction, and both the first relief structure and the second relief structure are roughly plate-shaped. The first relief structure and the second relief structure are arranged in a laminated manner, that is, the first relief structure and the second relief structure are arranged roughly in parallel.

That is, in this embodiment, the first relief structure and the second relief structure are stacked to form a composite grating, where the composite grating is equivalent to an asymmetric two-dimensional grating, so that after the light reaches the composite grating, the light is diffracted by the composite grating. The light may adjust a diffraction direction in a specific direction when passing through the first relief structure, and then adjust the diffraction direction in another direction when passing through the second relief structure, or a part of the light may adjust the diffraction direction in the first relief structure, and the other part adjusts the diffraction direction in the second relief structure, to implement diffraction direction adjustment and energy distribution of light in two different directions, improve light coupling efficiency, effectively improve brightness and chromaticity uniformity of the light, and improve the imaging effect of the electronic device including the composite grating.

In a possible implementation, the included angle between the projection, on the reference plane, of the extension direction of the first slit and the projection, on the reference plane, of the extension direction of the second slit is 45 degrees to 60 degrees. An included angle $\theta$ between a projection, on the reference plane, of the extension direction of the first slit and a projection, on the reference plane, of the extension direction of the second slit is limited to 45 degrees to 60 degrees, so that optical coupling efficiency of the light is maximized, brightness and chromaticity uniformity of the light is effectively improved, and the imaging effect of the electronic device with the composite grating is improved.

In a possible implementation, the second relief structure is partially embedded in the first slit, to match the first relief structure.

In a possible implementation, a refractive index of the first relief structure and a refractive index of the second relief structure are both between 1.5 and 2.8, and the refractive index of the first relief structure is greater than the refractive index of the second relief structure. The first relief structure and the second relief structure have a high refractive index, which can effectively improve optical efficiency and improve imaging quality of an electronic device with the composite grating. In another embodiment, the refractive indexes of the first relief structure and the second relief structure may alternatively be greater than 2.8.

In a possible implementation, the composite grating further includes an intermediate layer, where the intermediate layer is disposed between the first relief structure and the second relief structure, a refractive index of the first relief structure and a refractive index of the second relief structure are between 1.5 and 2.8, and a refractive index of the intermediate layer is less than the refractive index of the first relief structure. The intermediate layer may be configured to separate the first relief structure from the second relief structure, and the intermediate layer may further be used as a template of the second relief structure. The first relief structure and the second relief structure have a high refractive index, which can effectively improve optical efficiency and improve imaging quality of an electronic device with the composite grating. In another embodiment, the refractive indexes of the first relief structure and the second relief structure may alternatively be greater than 2.8.

In a possible implementation, the first relief structure and the second relief structure each are an asymmetric grating.

In a possible implementation, the first relief structure is a blazed grating or a slanted grating; and/or the second relief structure is a blazed grating or a slanted grating. Certainly, in another embodiment, the first relief structure and the second relief structure may alternatively be other asymmetric gratings.

In a possible implementation, a material of the first relief structure is nano-imprint-lithography resist or titanium dioxide; and/or a material of the second relief structure is nano-imprint-lithography resist or titanium dioxide. The nano-imprint-lithography resist is nano-imprint-lithography resist with a high refractive index, for example, polyorganosiloxane. The nano-imprint-lithography resist and the titanium dioxide have a high refractive index, which can effectively improve optical efficiency and improve imaging quality of an electronic device with the composite grating.

In a possible implementation, the composite grating further includes an auxiliary layer, the auxiliary layer is disposed on a side of the first relief structure that faces away from the second relief structure, and the auxiliary layer is a template for assisting in forming the first relief structure.

In a possible implementation, the composite grating further includes a substrate, and the substrate is located on the side of the first relief structure that faces away from the second relief structure. The substrate is configured to carry the first relief structure and the second relief structure.

In a possible implementation, the composite grating further includes a third relief structure, and the third relief structure is disposed on a side of the second relief structure that faces away from the first relief structure. There may be one or more third relief structures, and the third relief structure may be a blazed grating or a slanted grating. A material of the third relief structure may be nano-imprint-lithography resist, titanium dioxide, or another material. A refractive index of the third relief structure is 1.5 to 2.8 (including 1.5 and 2.8), or a refractive index of the third relief structure may be greater than 2.8. The period, the height, and the duty cycle of the third relief structure may be the same as or different from the period, the height, and the duty cycle of the first relief structure (or the second relief structure) respectively.

According to a second aspect, a diffraction optical waveguide is provided. The diffraction optical waveguide includes a waveguide base and the foregoing composite grating, where the composite grating is installed on a surface of the waveguide base to form an in-coupling grating and/or an out-coupling grating of the waveguide base. The diffraction optical waveguide with the composite grating can improve optical coupling efficiency of light, effectively improve brightness and chromaticity uniformity of light, and improve an imaging effect of an electronic device with the composite grating.

According to a third aspect, an electronic device is provided. The electronic device includes an image emitter and the foregoing diffraction optical waveguide, and light emitted by the image emitter is transmitted through the diffraction optical waveguide. The electronic device with the diffraction optical waveguide can improve optical coupling efficiency of light, effectively improve brightness and chromaticity uniformity of light, and improve an imaging effect.

According to a fourth aspect, a method for manufacturing a composite grating is provided. The manufacturing method includes: forming a first relief structure, where the first relief structure includes a plurality of first slits; and forming a second relief structure on a light incident side of the first relief structure to form a composite grating, where the second relief structure includes a plurality of second slits, the second slit faces away from the first relief structure, a surface of the first relief structure that faces away from the second relief structure is a reference plane, and an included angle between a projection, on the reference plane, of an extension direction of the second slit and a projection, on the reference plane, of an extension direction of the first slit is 10 degrees to 90 degrees (including 10 degrees and 90 degrees).

That is, in this embodiment, the first relief structure and the second relief structure are stacked to form a composite grating, where the composite grating is equivalent to an asymmetric two-dimensional grating, so that after the light reaches the composite grating, the light is diffracted by the composite grating. The light may adjust a diffraction direction in a direction when passing through the first relief structure, and then adjust the diffraction direction in another direction when passing through the second relief structure, or a part of the light may adjust the diffraction direction in the first relief structure, and the other part adjusts the diffraction direction in the second relief structure, to implement diffraction direction adjustment and energy distribution of light in two different directions, improve light coupling efficiency, effectively improve brightness and chromaticity uniformity, and improve the imaging effect of the electronic device including the composite grating.

It can be understood that although the concept of asymmetric two-dimensional grating is mentioned in the related technology, the asymmetric two-dimensional grating processing is very complicated and the process is very difficult, and even a grating master cannot be made at present. In this application, the first relief structure and the second relief structure are stacked, which may also be understood as two one-dimensional gratings are stacked. In addition, an included angle $\theta$ between projections, on the reference plane, of extension directions of two slits of the two one-dimensional gratings is limited to 10 degrees to 90 degrees, so that a composite grating equivalent to an asymmetric two-dimensional grating is formed, and processing difficulty is low, brightness and chromaticity uniformity of the light are effectively improved, and an imaging effect of the electronic device including the composite grating is improved.

In a possible implementation, the included angle between the extension direction of the first slit and the extension direction of the second slit is 45 degrees to 60 degrees (including 45 degrees and 60 degrees). An included angle $\theta$ between a projection, on the reference plane, of the extension direction of the first slit and a projection, on the reference plane, of the extension direction of the second slit is limited to 45 degrees to 60 degrees, so that optical coupling efficiency of the light is maximized, brightness and chromaticity uniformity of the light is effectively improved, and the imaging effect of the electronic device including the composite grating is improved.

In a possible implementation, a refractive index of the first relief structure and a refractive index of the second relief structure are between 1.5 and 2.8, and the refractive index of the first relief structure is greater than the refractive index of the second relief structure. The first relief structure and the second relief structure have a high refractive index, which can effectively improve optical efficiency and improve imaging quality of an electronic device with the composite grating. In another embodiment, the refractive indexes of the first relief structure and the second relief structure may alternatively be greater than 2.8.

In a possible implementation, the step of forming the second relief structure includes: forming an intermediate layer on a side of the first relief structure that faces away from a substrate, and forming the second relief structure on a side of the intermediate layer that faces away from the first relief structure.

In a possible implementation, a refractive index of the first relief structure and a refractive index of the second relief structure are between 1.5 and 2.8, and a refractive index of the intermediate layer is less than the refractive index of the first relief structure. The intermediate layer may be configured to separate the first relief structure from the second relief structure, and the intermediate layer may further be used as a template of the second relief structure. The first relief structure and the second relief structure have a high refractive index, which can effectively improve optical efficiency and improve imaging quality of an electronic device with the composite grating. In another embodiment, the refractive indexes of the first relief structure and the second relief structure may alternatively be greater than 2.8.

In a possible implementation, the first relief structure is formed by using a nano-imprint process, a dry etching process, or a coating process; and/or the second relief structure is formed by a nano-imprint process, a dry etching process, or a coating process. The coating method may be electron beam evaporation, magnetron sputtering, atomic layer deposition, electroplating, and the like. Compared with the dry etching process, the coating process is easier to realize and can improve the mass production of the product.

In a possible implementation, the first relief structure and the second relief structure each are an asymmetric grating.

In a possible implementation, the first relief structure is a blazed grating or a slanted grating; and/or the second relief structure is a blazed grating or a slanted grating. Certainly, in another embodiment, the first relief structure and the second relief structure may alternatively be other asymmetric gratings.

In a possible implementation, the forming a first relief structure includes: forming the first relief structure on the substrate. The substrate is configured to carry the first relief structure.

In a possible implementation, the manufacturing method further includes forming an auxiliary layer on the substrate, where the auxiliary layer is a template for assisting in forming the first relief structure, and forming the first relief structure on a side of the auxiliary layer that faces away from the substrate.

In a possible implementation, the manufacturing method further includes: forming a third relief structure on a side of the second relief structure that faces away from the first relief structure. There may be one or more third relief structures, and the third relief structure may be a blazed grating or a slanted grating. A material of the third relief structure may be nano-imprint-lithography resist, titanium dioxide, or another material. A refractive index of the third relief structure is 1.5 to 2.8 (including 1.5 and 2.8), or a refractive index of the third relief structure may be greater than 2.8. The period, the height, and the duty cycle of the third relief structure may be the same as or different from the period, the height, and the duty cycle of the first relief structure (or the second relief structure) respectively.

BRIEF DESCRIPTION OF THE DRAWINGS

To describe technical solutions in embodiments the background of this application more clearly, the following describes accompanying drawings used for describing embodiments or the background of this application.

DETAILED DESCRIPTION OF ILLUSTRATIVE EMBODIMENTS

Figure 1:
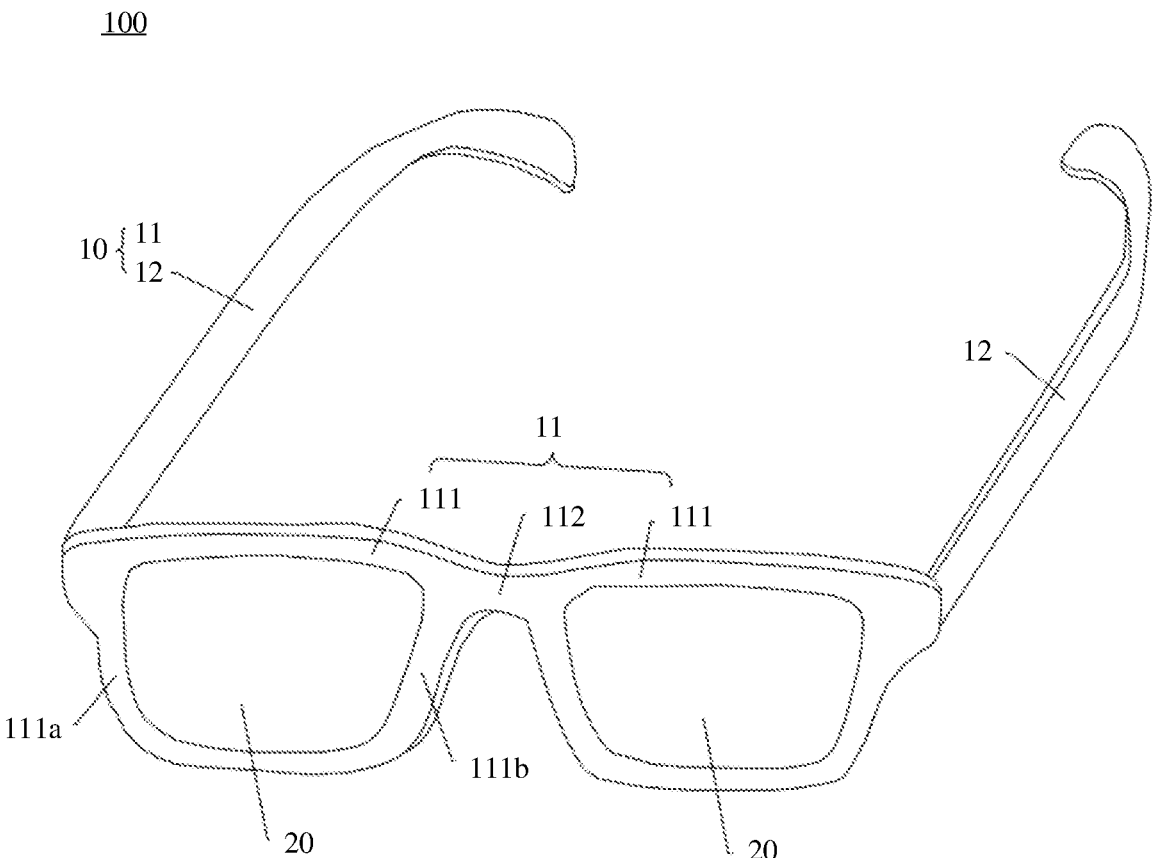
FIG. 1 is a schematic diagram of a structure of an electronic device according to an embodiment of this application.

The following describes embodiments of this application with reference to the accompanying drawings in embodiments of this application.

For ease of understanding, the following first explains and describes technical terms in this application.

A grating is an optical device including a large number of parallel slits with equal width and spacing, and is an optical element with a periodic structure that can divide light into different diffraction orders to implement large-angle deflection in a light propagation direction.

A one-dimensional grating is a grating structure that has periodic changes only in a direction perpendicular to a grid line and does not have periodic changes in a direction parallel to the grid line.

A two-dimensional grating is a grating structure that presents periodic changes in both directions.

A blazed grating, also referred to as a small stepped grating, is a specific reflection or transmission diffraction grating structure designed to produce maximum diffraction efficiency at a specific diffraction level.

A slanted grating is a grating structure whose cross-section perpendicular to the grid line is in a shape of periodic parallelograms or non-isosceles trapezoids.

In the description of embodiments of this application, it should be noted that: Unless otherwise specified and defined, the terms "installation" and "connection" shall be understood in a broad sense. For example, the "connection" may be a detachable or non-removable connection, or may be a direct connection or an indirect connection through an intermediate medium. The "fixed connection" means that they are connected to each other and that a relative position relationship after the connection remains unchanged. "Rotating connection" means that they are connected to each other and capable of relatively rotating when connected. The orientation terms mentioned in embodiments of this application, for example, "upper", "left", "right", "inside", and "outside", are merely directions in which reference is made to the accompanying drawings. Therefore, the orientation terms used are intended to better and more clearly describe and understand embodiments of this application, instead of indicating or implying that the apparatus or element must have a specific orientation, be constructed in a specific orientation, and operate in a specific orientation. Therefore, the orientation terms used cannot be construed as a limitation on embodiments of this application. "A plurality of" means at least two.

An embodiment of this application provides an electronic device 100, configured to be worn on a head of a user. The electronic device 100 may be a head-mounted display device. For example, the electronic device 100 may be an augmented reality device, such as augmented reality (augmented reality, AR) glasses, an AR helmet, mixrtual reality (mixrtual reality, MR) glasses, an MR helmet, or other electronic device that combines digital content with real-life scenes. Alternatively, the electronic device 100 may not be worn on the head. Alternatively, the electronic device 100 may not be an augmented reality device. In this application, an example in which the electronic device 100 is AR glasses is used for specific description.

Refer to FIG. 1. FIG. 1 is a schematic diagram of a structure of an electronic device 100 according to an embodiment of this application.

In this embodiment, the electronic device 100 includes a bracket 10 and an augmented reality component 20 installed on the bracket 10. There are two augmented reality components 20, and the two augmented reality components 20 are installed on the bracket 10 at intervals. Certainly, in another embodiment, there may alternatively be one or more enhancement display components 20. This is not specifically limited in this application.

The bracket 10 includes a frame 11 and legs 12 connected to the frame 11. There are two legs 12, and the two legs 12 are connected to two opposite ends of the frame 11. It should be noted that, in another embodiment, the bracket 10 may alternatively include a frame 11 and a fastening belt connected to the frame 11. This is not specifically limited in this application.

The frame 11 includes two rims 111 and a cross beam 112 connected between the two rims 111. Each rim 111 includes a first rim 111*a* away from the cross beam 112 and a second rim 111*b* disposed opposite to the first rim 111*a*. An accommodating cavity is disposed inside the first rim 111*a*, and the accommodating cavity of the first rim 111*a* is configured to accommodate an electronic component of the electronic device. The cross beam 112 and the two rims 111 are integrally formed, to simplify a molding process of the frame 11 and increase overall strength of the frame 11. A material of the frame 11 includes but is not limited to a metal, a plastic, a resin, a natural material, or the like. It should be understood that the frame 11 is not limited to the full-frame shown in FIG. 1, but may alternatively be a half-frame frame or a frameless frame.

The two legs 12 are rotatably connected to two opposite ends of the frame 11. Specifically, the two legs 12 are respectively rotatably connected to the two rims 111 of the frame 11. The two legs 12 are respectively connected to the first rims 111*a* of the two rims 111. When the electronic device 100 is in an unfolded state (as shown in FIG. 1), the two legs 12 rotate relative to the frame 11 to face each other. In this case, the two legs 12 of the electronic device 100 may be respectively mounted on two ears of the user, and the cross beam 112 is mounted on a nose bridge of the user, to be worn on the head of the user. When the electronic device 100 is in a folded state, the two legs 12 rotate relative to the frame 11 to at least partially overlap each other and be accommodated inside the frame 11. In this case, the electronic device 100 can be housed.

It may be understood that in another embodiment, the two legs 12 may be respectively fixedly connected to the first rims 111*a* of the two rims 111. Alternatively, the two legs 12 may be integrally formed with the frame 11, that is, the electronic device 100 is always in an unfolded state. This is not specifically limited in this application. It should be noted that an accommodating cavity may also be disposed inside the leg 12, and the accommodating cavity of the leg 12 may accommodate the electronic component of the electronic device 100.

It should be noted that, when the electronic device 100 is mentioned in this application, orientation terms such as "inner side" and "outer side" are mainly described based on an orientation of the electronic device 100 when the electronic device 100 is worn by the user on the head. When the electronic device 100 is worn by the user, a side that is close to the head of the user is used as an inner side, and a side that is away from the head of the user is used as an outer side. This does not limit an orientation of the electronic device 100 in another scenario.

Figure 2:
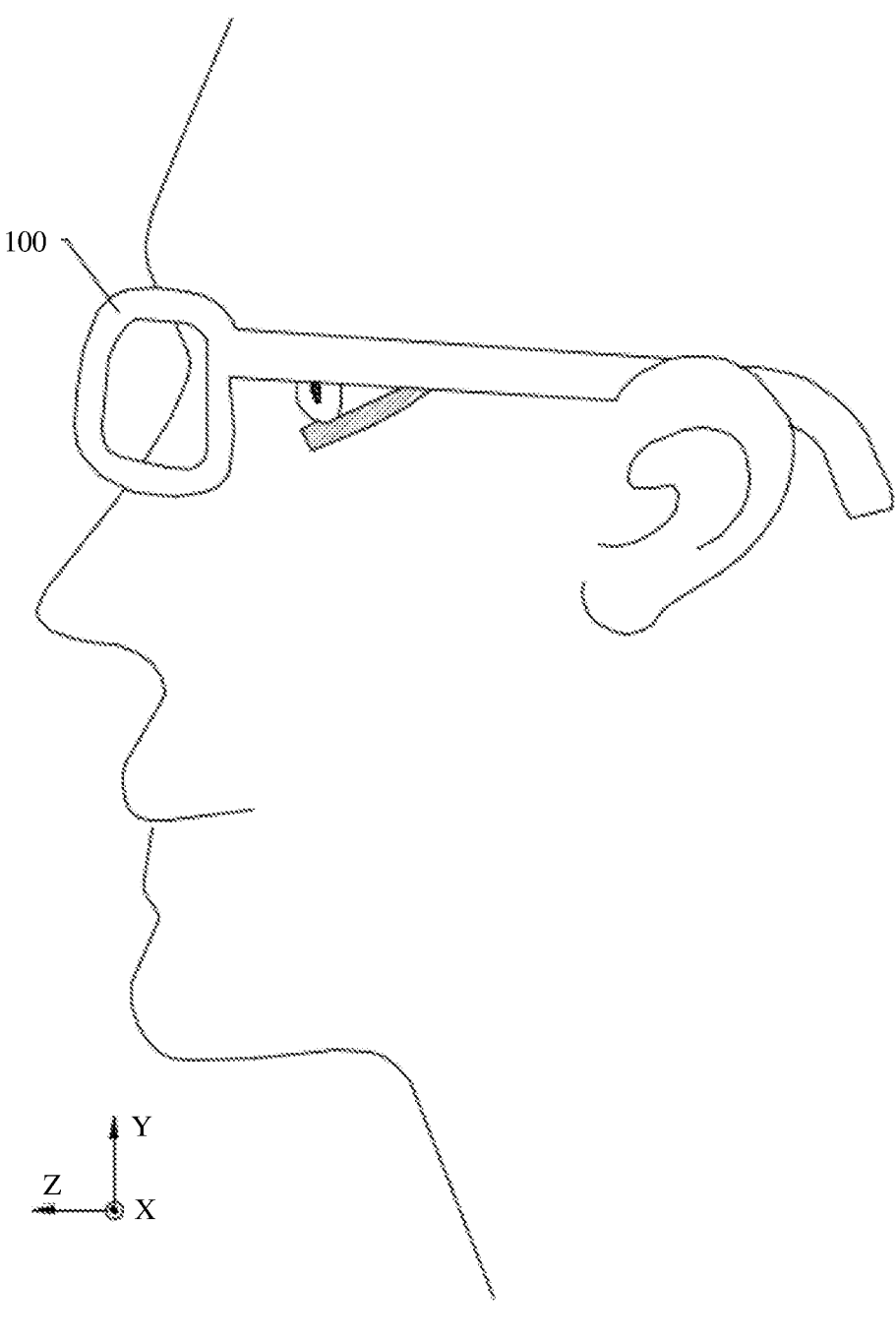
FIG. 2 is a schematic diagram of a structure of the electronic device that is shown in FIG. 1 and that is worn on a head of a user.
Figure 3:
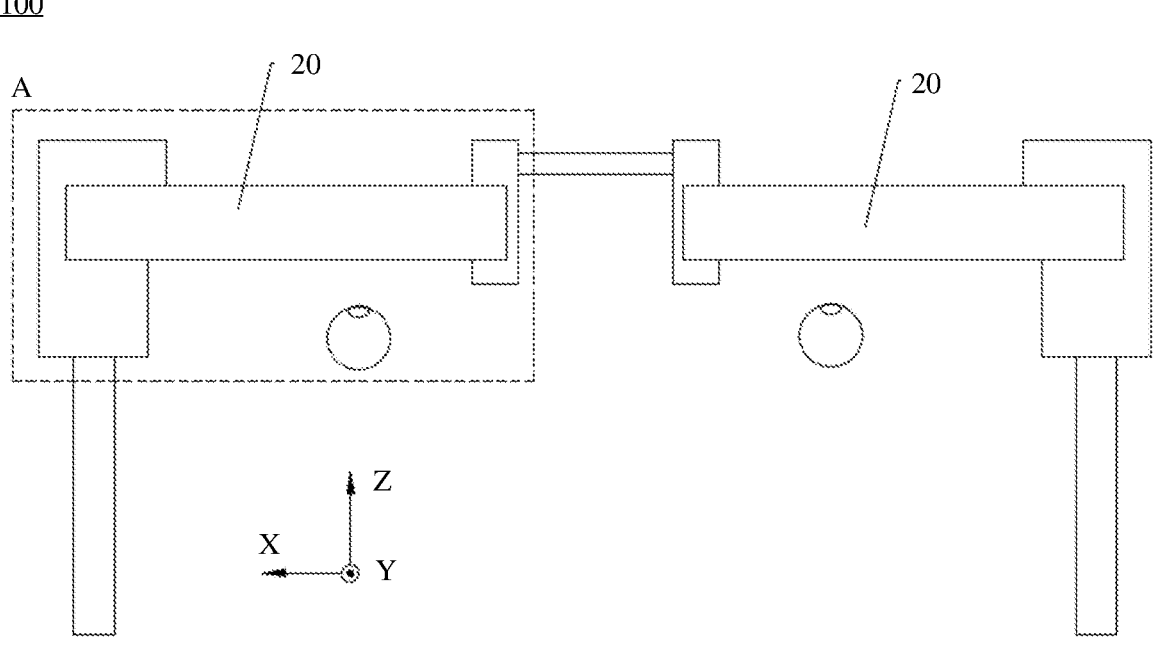
FIG. 3 is a schematic diagram of a simplified structure of the structure shown in FIG. 2.

Refer to FIG. 2 and FIG. 3 together. FIG. 2 is a schematic diagram of a structure of the electronic device 100 that is shown in FIG. 1 and that is worn on a head of a user. FIG. 3 is a schematic diagram of a simplified structure of the structure shown in FIG. 2.

Next, for ease of description, as shown in FIG. 2 and FIG. 3, a length direction of the electronic device 100 is defined as an X-axis direction, a width direction of the electronic device 100 is defined as a Y-axis direction, a thickness direction of the electronic device 100 is defined as a Z-axis direction, and the X direction, the Y direction, and the Z direction are mutually perpendicular. The X-axis direction is a direction in which one rim 111 of the frame 11 faces the other rim 111, and the Z-axis direction is a direction in which the frame 11 faces the leg 12.

In this embodiment, structures of the two augmented reality components 20 are the same. Specifically, the two augmented reality components 20 are respectively installed on the two rims 111 of the frame 11. When the electronic device 100 is worn on the head of the user, one electronic device 100 corresponds to a left eye of the user, and the other electronic device 100 corresponds to a right eye of the user. In this case, the two eyes of the user may view the virtual scene and the real scene by using the two electronic devices 100. It should be noted that, in another embodiment, structures of the two electronic devices 100 may be different. This is not specifically limited in this application.

Next, for ease of understanding, a structure of the augmented reality component 20 is specifically described by using an example of the augmented reality component 20 corresponding to the left eye of the user.

Figure 4:
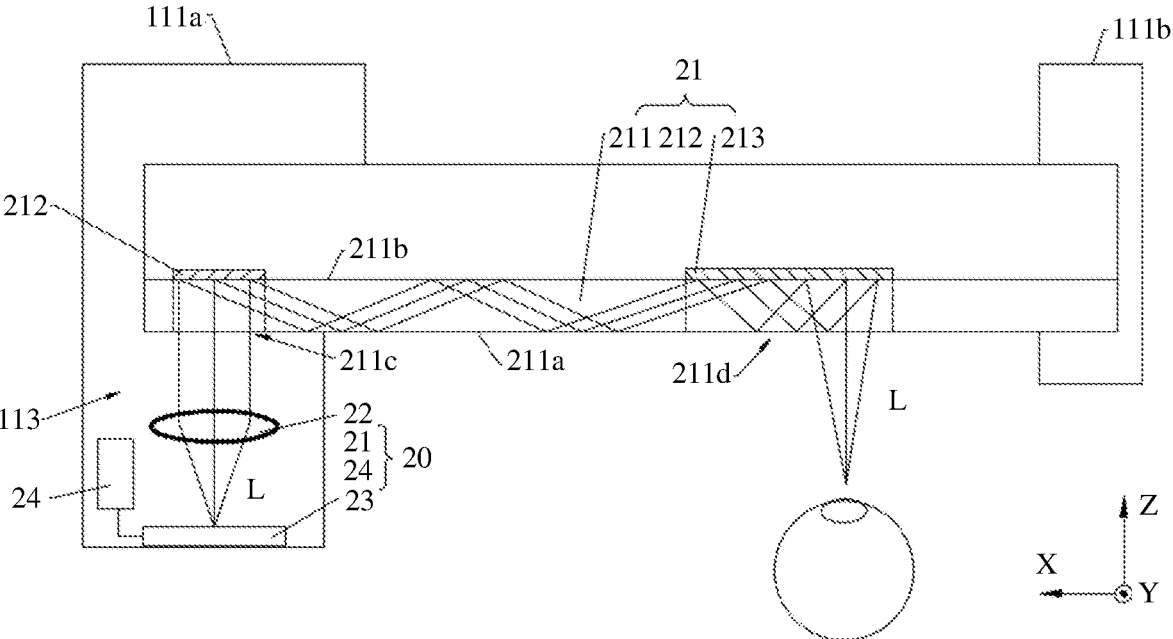
FIG. 4 is a schematic diagram of an enlarged structure of an area A in the structure shown in FIG. 3 in an embodiment.

Refer to FIG. 3 and FIG. 4. FIG. 4 is a schematic diagram of an enlarged structure of an area A of the structure shown in FIG. 3 in an embodiment.

The augmented reality component 20 includes a diffraction optical waveguide 21, an optical system 22, an image emitter 23, and a processor 24. Specifically, the diffraction optical waveguide 21, the optical system 22, the image emitter 23, and the processor 24 are all installed on the bracket 10. The processor 24 is coupled to the image emitter 23 to control enabling and disabling of the image emitter 23.

It should be noted that, in another embodiment, the two augmented reality components 20 may include only one processor 24. In addition, the processor 24 is coupled to the image emitters 23 of the two augmented reality components 20 to control enabling and disabling of the two image emitters 23. This is not specifically limited in this application.

The diffraction optical waveguide 21 is installed on the frame 11 of the bracket 10. In this embodiment, the diffraction optical waveguides 21 of the two augmented reality components 20 are disposed side by side along the X-axis direction. Specifically, the diffraction optical waveguides 21 of the two augmented reality components 20 are installed on the frame 11 at intervals. The diffraction optical waveguide 21 is installed on the rim 111 of the frame 11. The diffraction optical waveguide 21 includes an inner surface and an outer surface, and the inner surface of the diffraction optical waveguide 21 is a surface of the diffraction optical waveguide 21 that faces an inner side of the frame 11. That is, the outer surface of the diffraction optical waveguide 21 is a surface of the diffraction optical waveguide 21 that faces an outer side of the frame 11. It should be noted that, in another embodiment, the diffraction optical waveguide 21 may further be formed as a device that combines digital content and a real scene by adding other components.

Specifically, the diffraction optical waveguide 21 includes a waveguide base 211, an in-coupling grating 212, and an out-coupling grating 213. The waveguide base 211 is installed on the rim 111. One end of the waveguide base 211 is installed on the first rim 111a of the rim 111, and is accommodated in the accommodating cavity 113 of the first rim 111a. The other end of the waveguide base 211 is installed on the second rim 111b of the rim 111. The waveguide base 211 includes an inner surface 211a and an outer surface 211b that are disposed opposite to each other. The inner surface 211a of the waveguide base 211 is a surface of the waveguide base 211 that faces the inner side of the frame 11. That is, the outer surface 211b of the waveguide base 211 is a surface of the waveguide base 211 that faces the outer side of the frame 11.

In this embodiment, the in-coupling grating 212 and the out-coupling grating 213 are reflective gratings, and the in-coupling grating 212 is installed on the outer surface 211b of the waveguide base 211, and is located in the accommodating cavity 113 of the first rim 111a. The out-coupling grating 213 is installed on the outer surface 211b of the waveguide base 211, is disposed at an interval from the in-coupling grating 212, and is located between the first rim ilia and the second rim 111b. It should be understood that the in-coupling grating 212 and the out-coupling grating 213 may alternatively be transmissive gratings. In this case, the in-coupling grating 212 and the out-coupling grating 213 are installed on the inner surface 211a of the waveguide base 211.

In this embodiment, the inner surface 211a of the waveguide base 211 is the inner surface of the diffraction optical waveguide 21. The inner surface 211a includes a light incident region 211c and a light exit region 211d. The light incident region 211c of the inner surface 211a is located in the accommodating cavity 113 of the first rim 111a. Specifically, the light incident region 211c of the inner surface 211a is a region covered by the projection of the in-coupling grating 212 on the inner surface 211a. That is, a region in the inner surface 211a of the diffraction optical waveguide 21 that directly faces the in-coupling grating 212 is the light incident region 211c of the inner surface 211a.

The light exit region 211d and the light incident region 211c of the inner surface 211a are disposed at intervals, and are located between the first rim 111a and the second rim 111b. Specifically, the light exit region 211d of the inner surface 211a is a region covered by the projection of the out-coupling grating 213 on the inner surface 211a. That is, a region in the inner surface 211a that directly faces the out-coupling grating 213 is the light exit region 211d of the inner surface 211a.

In this embodiment, both the optical system 22 and the image emitter 23 are located in the accommodating cavity 113 of the first rim 111a, the image emitter 23 is disposed opposite to the diffraction optical waveguide 21, and the optical system 22 is located between the diffraction optical waveguide 21 and the image emitter 23. Specifically, the optical system 22 is located on the side of the waveguide base 211 that faces away from the in-coupling grating 212. That is, the optical system 22 and the image emitter 23, and the in-coupling grating 212 are respectively located on two opposite sides of the waveguide. The optical system 22 and the image emitter 23 directly face the light incident region 211c of the inner surface 211a. It may be understood that, when the in-coupling grating 212 is a transmissive grating, the image emitter 23 and the in-coupling grating 212 are located on a same side of the waveguide base 211.

It should be noted that, in another embodiment, the image emitter 23 may alternatively be located in the accommodating cavity 113 of the leg 12 (that is, inside the leg 12), or the image emitter 23 may be partially located in the accommodating cavity 113 of the first rim 111a, and partially located in the accommodating cavity 113 of the leg 12. Alternatively, the image emitter 23 may not be located in the accommodating cavity 113 of the first rim 111a or the accommodating cavity 113 of the leg 12, and may be directly exposed on the surface of the rim 111, provided that a sight of the user is not blocked when the electronic device 100 is used.

The optical system 22 is a lens, and there is one lens. The image emitter 23 is a display screen, and the display screen may be, for example, an organic light-emitting diode (organic light-emitting diode, OLED) display screen, an active-matrix organic light-emitting diode or an active-matrix organic light-emitting diode (active-matrix organic light-emitting diode, AMOLED) display screen, a mini organic light-emitting diode (mini organic light-emitting diode) display screen, a micro light-emitting diode (micro light-emitting diode) display screen, a micro organic light-emitting diode (micro organic light-emitting diode) display screen, or a quantum dot light-emitting diode (quantum dot light-emitting diode, QLED) display screen.

Certainly, in another embodiment, there may be two or more lenses. Alternatively, the optical system 22 may further include a prism, or include both a prism and a lens. The image emitter 23 may alternatively be an image projector. The image projector includes, but is not limited to, a liquid crystal on silicon (liquid crystal on silicon, LCOS), a digital light processor (digital light processor, DLP), a light-emitting diode (light-emitting diode, LED), an organic light-emitting diode (organic light-emitting diode, OLED), a quantum dot light-emitting diode (quantum dot light-emitting diode, QLED), an active-matrix organic light-emitting diode (active-matrix organic light-emitting diode, AMOLED), a flex light-emitting diode (flex light-emitting diode, FLED), a mini LED, a micro OLED, a micro LED, or a laser micro electro mechanical system (laser micro electro mechanical system, Laser MEMS).

In this embodiment, the processor 24 is located in the accommodating cavity 113 of the first rim 111a, and is electrically connected to the image emitter 23, and the processor 24 is configured to control enabling and disabling of the image emitter 23. The processor 24 may include one or more processing units. The plurality of processing units may be, for example, an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, and/or a neural-network processing unit (neural-network processing unit, NPU). Different processing units may be independent components, or may be integrated into one or more processors. It should be understood that the processor 24 may be a central processing unit (central processing unit, CPU) of the electronic device 100, or may be another processor of the electronic device 100.

When the processor 24 starts the image emitter 23, that is, when the image emitter 23 is in an enabled state, a display light L emitted by the image emitter 23 passes through the optical system 22 and enters the diffraction optical waveguide 21. Specifically, the display light L is vertically incident to the inner surface 211a of the waveguide base 211, vertically incident from the light incident region 211c of the inner surface 211a to the in-coupling grating 212, and is coupled to the waveguide base 211 via the in-coupling grating 212. The in-coupling grating 212 has adjusted the propagation direction of the display light L to a state that meets a total reflection condition. The display light L undergoes total reflection in the waveguide base 211 for at least one time and propagates in a direction of the out-coupling grating 213 until the display light L reaches the out-coupling grating 213 and is diffracted. After being diffracted, the display light L propagates from the light exit region 211d of the inner surface 211a toward the inner side of the diffraction optical waveguide 21, that is, propagates toward a direction of human eyes, and may enter the human eyes for imaging, so that the user can view a virtual scene carrying digital content. It may be understood that, when the processor 24 disables the image emitter 23, that is, when the image emitter 23 is in a disabled state, the image emitter 23 does not project the display light L. In this case, no display light L enters the human eyes for imaging.

In this embodiment, the in-coupling grating 212 and the out-coupling grating 213 may include one or more composite gratings. For example, when the in-coupling grating 212 is a composite grating, a three-color (red, green, and blue) light from the image emitter 23 is diffracted through the composite grating. When the in-coupling grating 212 includes three composite gratings, the three-color (red, green and blue) light from the image emitter 23 is diffracted through the three composite gratings, each composite grating optimizes a specific color, so that the color uniformity at an exiting pupil position may be improved, which reduces a rainbow effect. In this embodiment, structures of the in-coupling grating 212 and the out-coupling grating 213 are the same. It should be noted that, in another embodiment, structures of the in-coupling grating 212 and the out-coupling grating 213 may be different. This is not specifically limited in this application.

Next, for ease of understanding, a composite grating coupled to the out-coupling grating 213 is specifically described by using the out-coupling grating 213 as an example.

Figure 5:
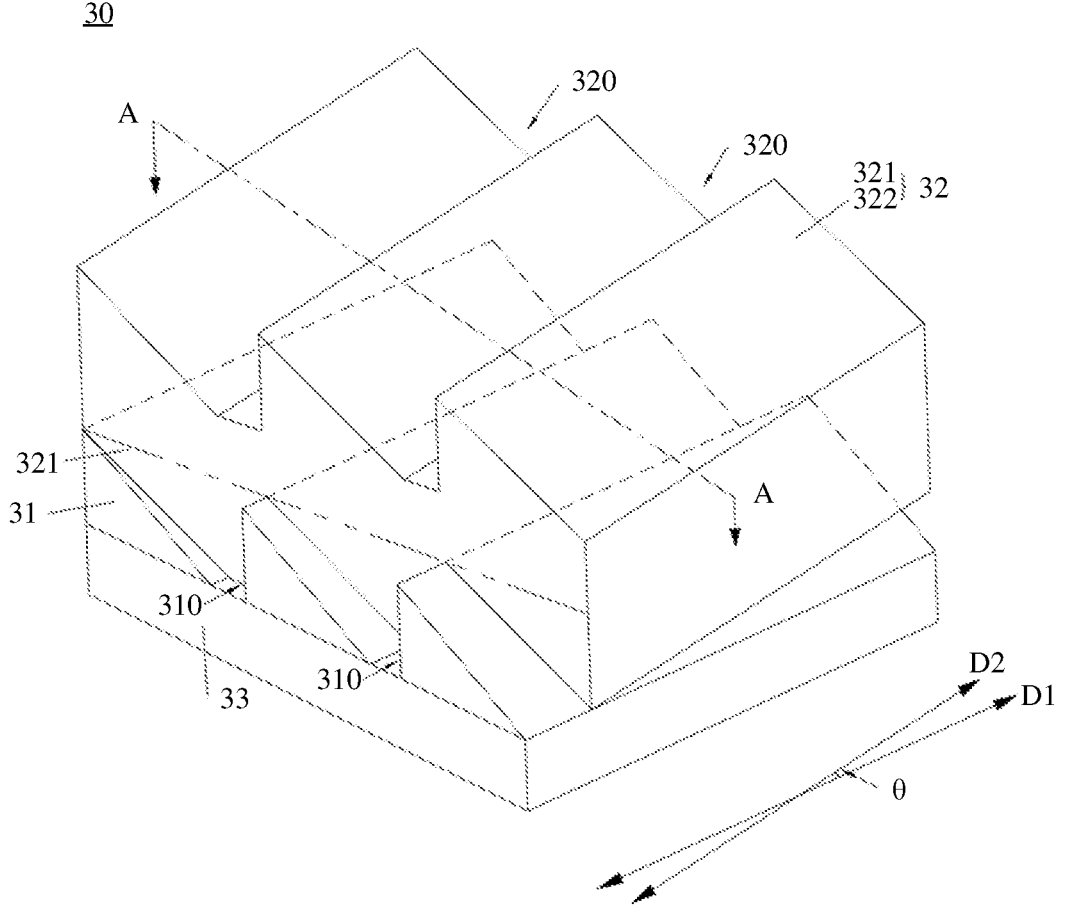
FIG. 5 is a schematic diagram of a structure of a composite grating according to an embodiment of this application.
Figure 6:
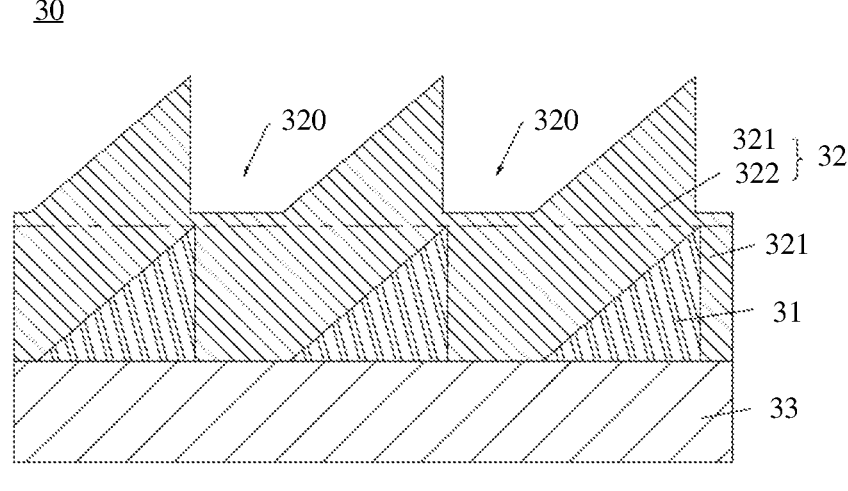
FIG. 6 is a schematic diagram of a cross-sectional structure of the structure shown in FIG. 5 in an A-A direction.

Refer to FIG. 5 and FIG. 6. FIG. 5 is a schematic diagram of a structure of a composite grating 30 according to an embodiment of this application. FIG. 6 is a schematic diagram of a cross-sectional structure of the structure shown in FIG. 5 in an A-A direction. FIG. 6 shows only the structure of the composite grating 30 at the cross-sectional area, and does not show the structure other than the cross-sectional area.

The composite grating 30 includes a first relief structure 31 and a second relief structure 32. The first relief structure 31 includes a plurality of first slits 310 disposed in parallel, the second relief structure 32 includes a plurality of second slits 320 disposed in parallel, and the second relief structure 32 is superposed on a light incident side of the first relief structure 31. The second slit 320 faces away from the first relief structure 31, and a surface of the first relief structure 31 that faces away from the second relief structure 32 is a reference plane. An included angle θ between a projection, on the reference plane, of an extension direction D1 of the first slit 310 and a projection, on the reference plane, of an extension direction D2 of the second slit 320 is 10 degrees to 90 degrees (including 10 degrees and 90 degrees). Certainly, in another embodiment, the reference plane may be perpendicular to any plane in which a thickness direction of the composite grating 30 is located, and the reference plane may be a virtual plane or a physical plane.

It may be understood that, the extension direction of the first slit 310 is an extension direction of the first slit 310 in a length direction, the extension direction of the second slit 320 is an extension direction of the second slit 320 in a length direction, and both the first relief structure 31 and the second relief structure 32 are roughly plate-shaped. The first relief structure 31 and the second relief structure 32 are arranged in a laminated manner, that is, the first relief structure 31 and the second relief structure 32 are arranged roughly in parallel.

That is, in this embodiment, the first relief structure 31 and the second relief structure 32 are stacked to form a composite grating 30, where the composite grating 30 is equivalent to an asymmetric two-dimensional grating, so that after the display light L (FIG. 4) reaches the composite grating 30, the display light L is diffracted by the composite grating 30. The display light L may adjust a diffraction direction in a direction when passing through the first relief structure 31, and then adjust the diffraction direction in another direction when passing through the second relief structure 32, or a part of the display light L may adjust the diffraction direction in the first relief structure 31, and the other part adjusts the diffraction direction in the second relief structure 32, to implement diffraction direction adjustment and energy distribution of light in two different directions, improve light coupling efficiency of diffracting the display light L in the eye direction, effectively improve brightness and chromaticity uniformity of the display light L finally emitted to the eyes, and improve the imaging effect of the electronic device 100.

It can be understood that although the concept of asymmetric two-dimensional grating is mentioned in the related technology, the asymmetric two-dimensional grating processing is very complicated and the process is very difficult, and even a grating master cannot be made at present. In this application, the first relief structure 31 and the second relief structure 32 are stacked, which may also be understood as two one-dimensional gratings are stacked. In addition, an included angle θ between projections, on the reference plane, of extension directions of two slits of the two one-dimensional gratings is limited to 10 degrees to 90 degrees (including 10 degrees and 90 degrees), so that a composite grating 30 equivalent to an asymmetric two-dimensional grating is formed, and processing difficulty is low, brightness and chromaticity uniformity of the display light L that is finally projected to the eye are effectively improved, and an imaging effect of the electronic device 100 is improved.

In some embodiments, the included angle θ between the projection, on the reference plane, of the extension direction D1 of the first slit 310 and the projection, on the reference plane, of the extension direction D2 of the second slit 320 is 45 degrees to 60 degrees (including 45 degrees and 60 degrees). The included angle θ between the projection, on the reference plane, of the extension direction D1 of the first slit 310 and the projection, on the reference plane, of the extension direction D2 of the second slit 320 is limited to 45 degrees to 60 degrees, so that the optical coupling efficiency of diffracting the display light L in the eye direction is maximized, brightness and chromaticity uniformity of the display light L that is finally projected to the eye are effectively improved, and an imaging effect of the electronic device 100 is improved.

In this embodiment, the first relief structure 31 is a blazed grating. It may be understood that the entire first relief structure 31 is a blazed grating, or a part of the first relief structure 31 is a blazed grating. In the structure shown in FIG. 6, the entire first relief structure 31 is a blazed grating. The first relief structure 31 has a period ranging from 300 nm to 900 nm (including 300 nm and 900 nm), a height ranging from 50 nm to 600 nm (including 50 nm and 600 nm), and a duty cycle ranging from 0.1 to 0.9 (including 0.1 and 0.9). A material of the first relief structure 31 is nano-imprint-lithography resist, or a material of the first relief structure 31 is titanium dioxide. When the material of the first relief structure 31 is nano-imprint-lithography resist, the nano-imprint-lithography resist is nano-imprint-lithography resist with a high refractive index, for example, polyorganosiloxane, and the refractive index of the first relief structure 31 is greater than or equal to 1.5 and less than or equal to 2.2. The first relief structure 31 may be formed by a nano-imprint process. When the material of the first relief structure 31 is titanium dioxide, the refractive index of the first relief structure 31 is greater than or equal to 2.2 and less than or equal to 2.8. The first relief structure 31 may be formed by a dry etching process. The first relief structure 31 in this embodiment has a high refractive index, which can effectively improve optical efficiency and improve imaging quality of the electronic device 100.

Certainly, in a scenario of another embodiment, the first relief structure 31 may alternatively be an asymmetric grating such as a slanted grating. In a scenario of another embodiment, when the material of the first relief structure 31 is titanium dioxide, the first relief structure 31 may alternatively be formed by using a coating process. In another scenario of another embodiment, the material of the first relief structure 31 may alternatively be another material other than the nano-imprint-lithography resist and the titanium dioxide. The refractive index of the first relief structure 31 may be 1.5 to 2.8 (including 1.5 and 2.8), or the refractive index of the first relief structure 31 may be greater than 2.8.

Figure 10:
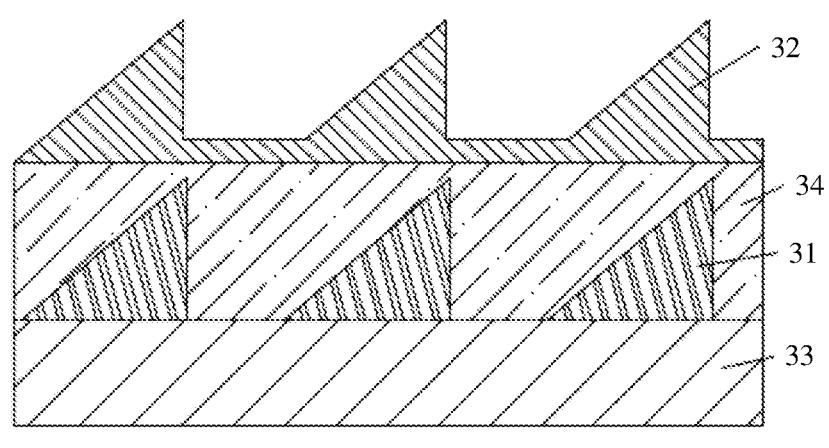
FIG. 10 is a schematic diagram of a structure of the composite grating shown in FIG. 5 in another embodiment.

In this embodiment, the second relief structure 32 is partially embedded in the first slit 310. Specifically, the second relief structure 32 includes a first part 321 and a second part 322 that are arranged in a laminated manner, and the first part 321 is embedded in the first slit 310 of the first relief structure 31 to match the first relief structure 31. It may be understood that, because the refractive index of the second relief structure 32 is different from that of the first relief structure 31, and the first part 321 is embedded in the first slit 310 of the first relief structure 31, it may also be considered that the first part 321 and the first relief structure 31 together form a one-dimensional grating. The first part 321 is also configured to carry the second part 322. In the second relief structure 32, the second part 322 actually performs a dimming function, and the second part 322 forms a one-dimensional grating in the composite grating 30. Certainly, in another embodiment, as shown in FIG. 10, the second relief structure 32 has only a second part 322 that carries the second relief structure 32 through an intermediate layer disposed in the first slit of the first relief structure 31.

Figure 7:
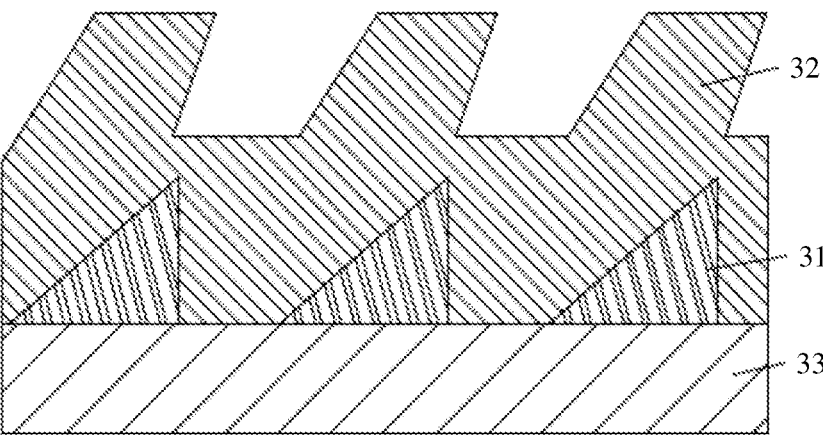
FIG. 7 is a schematic diagram of a structure of the composite grating shown in FIG. 5 in another implementation.
Figure 8:
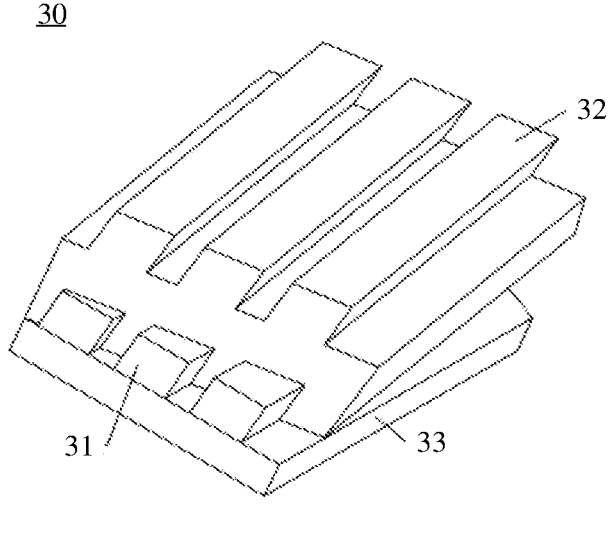
FIG. 8 is a schematic diagram of a structure of the composite grating shown in FIG. 5 in another implementation.
Figure 9:
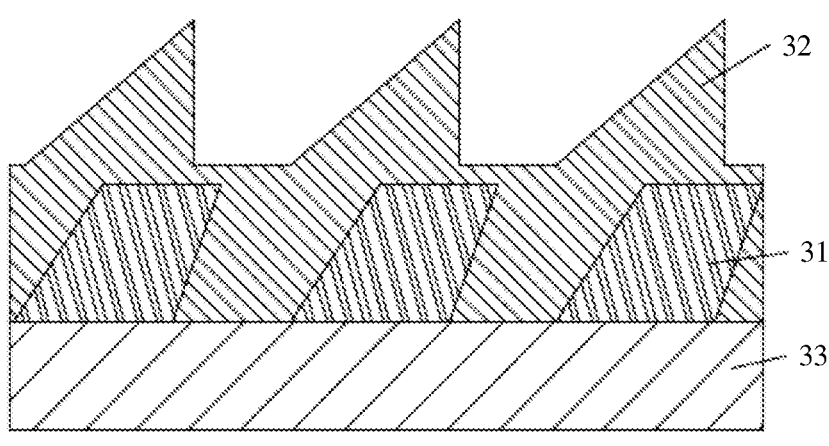
FIG. 9 is a schematic diagram of a structure of the composite grating shown in FIG. 5 in another implementation.

The second relief structure 32 is a blazed grating. It may be understood that the entire second relief structure 32 is a blazed grating, or a part of the relief structure 32 is a blazed grating. In this embodiment, the second part 322 of the relief structure 32 is a blazed grating. The second part 322 of the second relief structure 32 has a period ranging from 300 nm to 900 nm (including 300 nm and 900 nm), a height ranging from 50 nm to 600 nm (including 50 nm and 600 nm), and a duty cycle ranging from 0.1 to 0.9 (including 0.1 and 0.9). Materials of the first part 321 and the second part 322 of the second relief structure 32 are nano-imprint-lithography resist, the nano-imprint-lithography resist is nano-imprintlithography resist with a high refractive index, for example, polyorganosiloxane, and a refractive index of the second relief structure 32 is greater than or equal to 1.5 and less than or equal to 2.2. The second relief structure 32 may be formed by a nano-imprint process. The refractive index of the second relief structure 32 is less than the refractive index of the first relief structure 31. The second relief structure 32 in this embodiment has a high refractive index, which can effectively improve optical efficiency and improve imaging quality of the electronic device 100. The test wavelengths of all refractive index values of the first relief structure 31 and the second relief structure 32 are 587.56 nm. Refer to FIG. 7 to FIG. 9. FIG. 7 is a schematic diagram of a structure of the composite grating shown in FIG. 5 in another implementation. FIG. 8 is a schematic diagram of a structure of the composite grating shown in FIG. 5 in another implementation. FIG. 9 is a schematic diagram of a structure of the composite grating shown in FIG. 5 in another implementation. Both FIG. 7 and FIG. 9 show only the structure of the composite grating 30 at the cross-sectional area, and does not show the structure other than the cross-sectional area.

Certainly, in a scenario of another embodiment, as shown in FIG. 7, the first relief structure 31 is a blazed grating, and the second relief structure 32 is an asymmetric grating such as a slanted grating. In another scenario of another embodiment, as shown in FIG. 8, the first relief structure 31 is a slanted grating, and the second relief structure 32 is an asymmetric grating such as a slanted grating. In still another scenario of another embodiment, as shown in FIG. 9, the first relief structure 31 is a slanted grating, and the second relief structure 32 is an asymmetric grating such as a blazed grating.

In still another scenario of another embodiment, the material of the second relief structure 32 may further be another material other than the nano-imprint-lithography resist, for example, titanium dioxide, and the refractive index of the second relief structure 32 may further be 1.5 to 2.8 (including 1.5 and 2.8). Alternatively, the refractive index of the second relief structure 32 may be greater than 2.8. The second relief structure 32 may be formed by using a dry etching process, or may be obtained by performing coating on the nano-imprint pattern. The coating manner may be electron beam evaporation, magnetron sputtering, atomic layer deposition, or the like. The second relief structure 32 is formed by coating, which is easier to implement than the dry etching process, and can improve mass production of the product. In still another scenario of another embodiment, a period, a height, and a duty cycle of the second relief structure 32 may be different from a period, a height, and a duty cycle of the first relief structure 31 respectively.

In this embodiment, the composite grating 30 further includes a substrate 33, and the substrate 33 is located on a side of the first relief structure 31 that faces away from the second relief structure 32. The substrate 33 is configured to carry the first relief structure 31 and the second relief structure 32. A surface of the substrate 33 that faces or faces away from the first relief structure 31 may also be used as a reference plane. In this embodiment, a material of the substrate 33 is glass, and a refractive index of the substrate 33 is less than or equal to a refractive index of the first relief structure 31.

In another embodiment, the composite grating 30 may alternatively have no substrate. Alternatively, the composite grating 30 may further include a third relief structure, and the third relief structure is disposed on a side of the second relief structure 32 that faces away from the first relief structure 31. There may be one or more third relief structures, and the third relief structure may be a blazed grating or a slanted grating. A material of the third relief structure may be nano-imprint-lithography resist, titanium dioxide, or another material. A refractive index of the third relief structure is 1.5 to 2.8 (including 1.5 and 2.8), or a refractive index of the third relief structure may be greater than 2.8. The period, the height, and the duty cycle of the third relief structure may be the same as or different from the period, the height, and the duty cycle of the first relief structure 31 (or the second relief structure 32) respectively.

Figure 11:
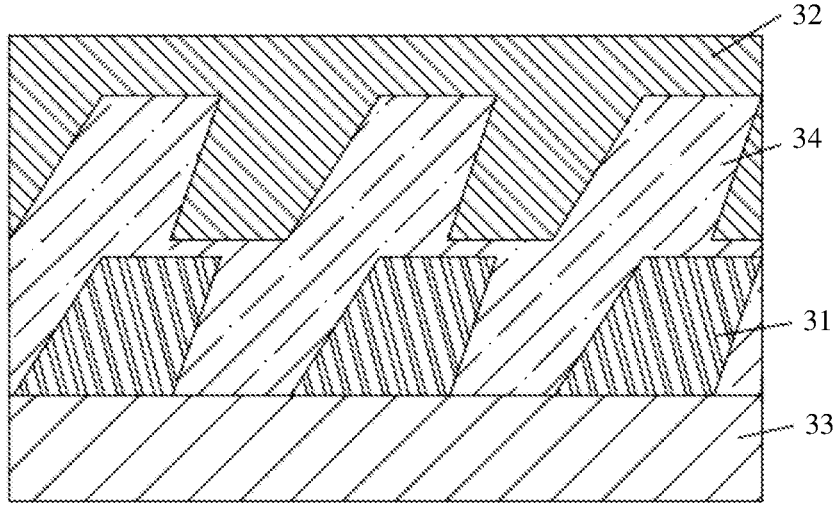
FIG. 11 is a schematic diagram of a structure of the composite grating shown in FIG. 10 in another implementation.

Refer to FIG. 10 and FIG. 11. FIG. 10 is a schematic diagram of a structure of the composite grating shown in FIG. 5 in another embodiment. FIG. 11 is a schematic diagram of a structure of the composite grating shown in FIG. 10 in another implementation. Both FIG. 10 and FIG. 11 show only the structure of the composite grating 30 at the cross-sectional area, and does not show the structure other than the cross-sectional area.

This embodiment is similar to the embodiment shown in FIG. 5. A difference lies in that the composite grating 30 in this embodiment further includes an intermediate layer 34, and the intermediate layer 34 is disposed between the first relief structure 31 and the second relief structure 32. The entire first relief structure 31 is a blazed grating/slanted grating, and the entire second relief structure 32 is a blazed grating/slanted grating. In this embodiment, the refractive index of the first relief structure 31 is the same as or different from the refractive index of the second relief structure 32, that is, the refractive index of the first relief structure 31 may be less than, equal to, or greater than the refractive index of the second relief structure 32, and the refractive index of the intermediate layer 34 is less than the refractive index of the first relief structure 31.

Specifically, the intermediate layer 34 and the second relief structure 32 are matched in a plurality of manners. In an implementation, as shown in FIG. 10, a material of the first relief structure 31 may be nano-imprint-lithography resist, or may be titanium dioxide. A material of the intermediate layer 34 is nano-imprint-lithography resist, a surface of the intermediate layer 34 that faces away from the first relief structure 31 is a plane, and the second relief structure 32 is directly formed on the plane. A material of the second relief structure 32 may be nano-imprint-lithography resist, or may be titanium dioxide.

In another implementation, as shown in FIG. 11, a material of the first relief structure 31 may be nano-imprint-lithography resist, or may be titanium dioxide. The material of the intermediate layer 34 is nano-imprint-lithography resist, the intermediate layer 34 is a template for assisting in forming the second relief structure 32, the material of the second relief structure 32 is titanium dioxide, and the second relief structure 32 is obtained by coating the side of the intermediate layer 34 that faces away from the first relief structure 31. The coating method may be electron beam evaporation, magnetron sputtering, atomic layer deposition, and the like. The intermediate layer 34 is located between the first relief structure 31 and the second relief structure 32, which may be understood as that the second slit 320 faces away from the first relief structure 31. Compared with the previous embodiment, the intermediate layer 34 is disposed only between the first relief structure 31 and the second relief structure 32 at intervals. The intermediate layer 34 in this embodiment also serves as a template for assisting in forming the second relief structure 32, thereby facilitating the formation of the second relief structure 32. In addition, a material of the second relief structure 32 in this implementation is titanium dioxide, and a refractive index of the second relief structure 32 is high, which can effectively improve light efficiency and improve imaging quality of the electronic device 100.

Figure 12:
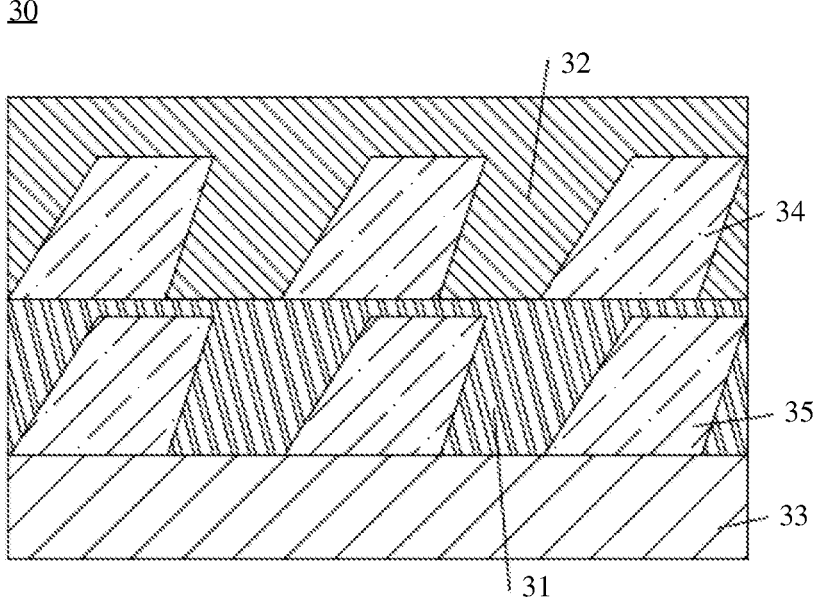
FIG. 12 is a schematic diagram of a structure of the composite grating shown in FIG. 5 in another embodiment.

Refer to FIG. 12. FIG. 12 is a schematic diagram of a structure of the composite grating shown in FIG. 5 in another embodiment. FIG. 12 shows only the structure of the composite grating 30 at the cross-sectional area, and does not show the structure other than the cross-sectional area.

This embodiment is similar to the embodiment shown in FIG. 11. A difference lies in that the composite grating 30 in this embodiment further includes an auxiliary layer 35, and the auxiliary layer 35 is disposed on a side of the first relief structure 31 that faces away from the second relief structure 32, that is, the auxiliary layer 35 is located between the substrate 33 and the first relief structure 31. Specifically, the material of the auxiliary layer 35 is nano-imprint-lithography resist, the auxiliary layer 35 serves as a template for assisting in forming the auxiliary first relief structure 31, the material of the first relief structure 31 is titanium dioxide, and the first relief structure 31 is obtained by coating the auxiliary layer 35. The coating method may be electron beam evaporation, magnetron sputtering, atomic layer deposition, and the like. Similarly, the intermediate layer 34 also serves as a template for assisting in forming the auxiliary second relief structure 32. The material of the second relief structure 32 is titanium dioxide, and the second relief structure 32 is obtained by coating the intermediate layer 34. The coating method may be electron beam evaporation, magnetron sputtering, atomic layer deposition, and the like.

In other words, materials of both the first relief structure 31 and the second relief structure 32 in this application are titanium dioxide, and refractive indexes of the first relief structure 31 and the second relief structure 32 are high, so that optical efficiency can be effectively improved, and imaging quality of the electronic device 100 can be improved. In addition, both the first relief structure 31 and the second relief structure 32 are formed in a coating manner. Compared with the dry etching process, the coating process is easier to implement, and mass production of the product can be improved. The auxiliary layer 35 and the intermediate layer 34 are made of the same material, to simplify the process flow and improve the production efficiency of the grating. Certainly, in another embodiment, the materials of the first relief structure 31 and the second relief structure 32 may alternatively be other materials with a high refractive index and may be formed in the form of coating.

Figure 13:
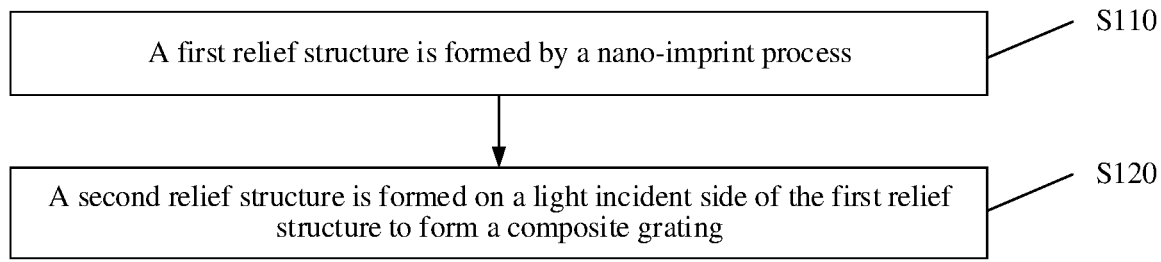
FIG. 13 is a schematic flowchart of a manufacturing method for manufacturing the composite grating shown in FIG. 5 according to an embodiment of this application.

Refer to FIG. 13. FIG. 13 is a schematic flowchart of a manufacturing method for manufacturing the composite grating 30 shown in FIG. 5 according to an embodiment of this application. As shown in FIG. 13, the method for manufacturing the composite grating 30 includes steps S110 to S120 as follows.

S110: Form a first relief structure 31.

Figure 14:
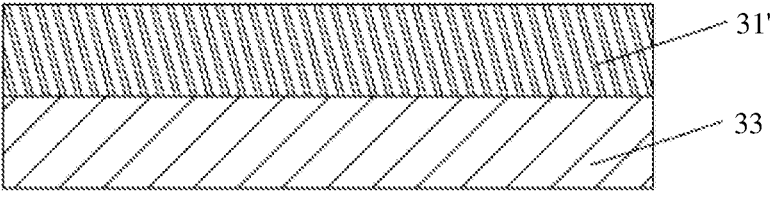
FIG. 14 is a flowchart of a specific process of the manufacturing method shown in FIG. 13.
Figure 14:
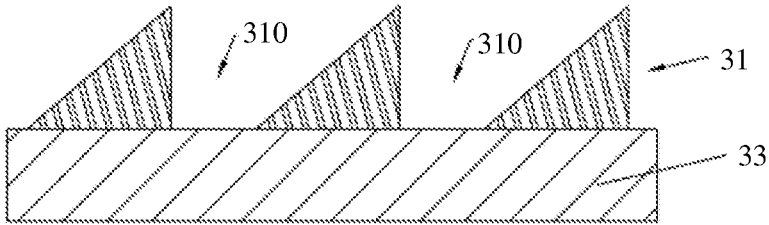
Figure 14:
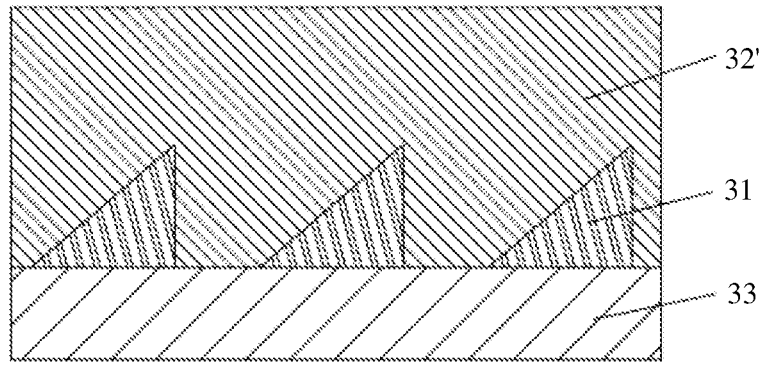
Figure 14:
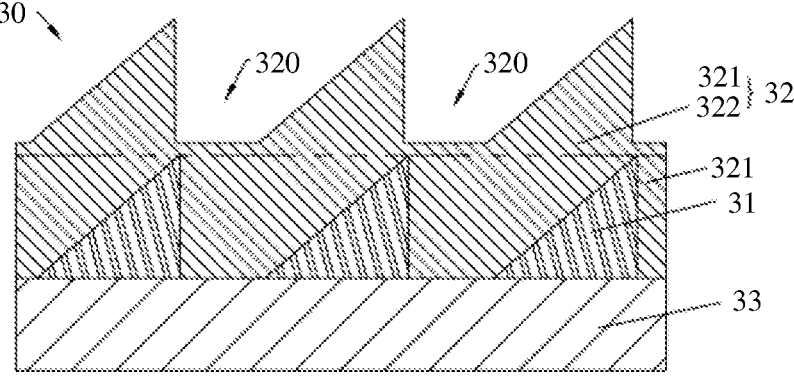

Refer to FIG. 14. FIG. 14 is a flowchart of a specific process of the manufacturing method shown in FIG. 13.

Specifically, forming the first relief structure 31 specifically includes providing a substrate 33, and forming the first relief structure 31 on the substrate 33. The first relief structure 31 includes a plurality of first slits 310 disposed in parallel. In this embodiment, a material of the substrate 33 is glass, and the substrate 33 is configured to carry the first relief structure 31. The material of the first relief structure 31 is nano-imprint-lithography resist.

As shown in FIG. 14, the first relief structure 31 may be formed by a nano-imprint process. Specifically, the forming process of the first relief structure 31 is as follows: First, a first imprint-lithography resist 31' with a specific thickness is spin-coated on the substrate 33, and then an imprint template is pressed on the first imprint-lithography resist 31' on a nano-imprint device through a nano-imprint process. Then, the imprint-lithography resist is cured by ultraviolet light, and the first relief structure 31 is obtained after demoulding. In this embodiment, the nano-imprint-lithography resist is nano-imprint-lithography resist with a high refractive index, for example, polyorganosiloxane, a refractive index of the first relief structure 31 is greater than or equal to 1.5 and less than or equal to 2.2, and a refractive index of the substrate 33 is less than or equal to a refractive index of the first relief structure 31. The first relief structure 31 has a high refractive index, which can effectively improve light efficiency. The first relief structure 31 is formed by a nano-imprint process, which is simple and easy to achieve mass production.

In this embodiment, the first relief structure 31 is a blazed grating. It may be understood that the entire first relief structure 31 is a blazed grating, or a part of the first relief structure 31 is a blazed grating. In the structure shown in FIG. 14, the entire first relief structure 31 is a blazed grating. The first relief structure 31 has a period ranging from 300 nm to 900 nm (including 300 nm and 900 nm), a height ranging from 50 nm to 600 nm (including 50 nm and 600 nm), and a duty cycle ranging from 0.1 to 0.9 (including 0.1 and 0.9).

Certainly, in a scenario of another embodiment, a material for forming the first relief structure 31 is titanium dioxide, and the first relief structure 31 may be formed by using a dry etching process or a coating process. In another scenario of another embodiment, the first relief structure 31 may alternatively be an asymmetric grating such as a slanted grating. When the first relief structure 31 is a slanted grating, a material for forming the first relief structure 31 may be nano-imprint-lithography resist, and the first relief structure 31 may be formed by using a nano-imprint process. The material for forming the first relief structure 31 may alternatively be titanium dioxide, and the first relief structure 31 may be formed by a dry etching or coating process. In still another scenario of another embodiment, the material of the first relief structure 31 may alternatively be another material other than the nano-imprint-lithography resist and the titanium dioxide. The refractive index of the first relief structure 31 may be 1.5 to 2.8 (including 1.5 and 2.8), or the refractive index of the first relief structure 31 may be greater than 2.8.

S120: A second relief structure 32 is formed on a light incident side of the first relief structure 31 to form a composite grating 30. The second relief structure 32 includes a plurality of second slits 320, where the second slit 320 faces away from the first relief structure 31, and a surface of the first relief structure 31 that faces away from the second relief structure 32 is a reference plane. An included angle θ between a projection, on the reference plane, of an extension direction of the second slit 320 and a projection, on the reference plane, of an extension direction of the first slit 310 is 10 degrees to 90 degrees. Certainly, in another embodiment, the reference plane may alternatively be a surface of the substrate that faces or faces away from the first relief structure 310. Alternatively, the reference plane may be perpendicular to any plane in which a thickness direction of the composite grating 30 is located, and the reference plane may be a virtual plane or a physical plane.

Specifically, refer to FIG. 14. The light incident side of the first relief structure 31 is a side of the first relief structure 31 that faces away from the substrate 33. A material of the second relief structure 32 may be nano-imprint-lithography resist, and the second relief structure 32 may be formed by using a nano-imprint process. The second relief structure 32 may be formed on the side of the first relief structure 31 that faces away from the substrate 33. Specifically, a second imprint-lithography resist 32' of a specific thickness is spin-coated on a side of the first relief structure 31 that faces away from the substrate 33, and then the second relief structure 32 is obtained by using a process such as nano-imprint, ultraviolet curing, demoulding, and the like, to form a composite grating 30. The second relief structure 32 is formed by a nano-imprint process, which is simple and easy to achieve mass production.

Figure 22:
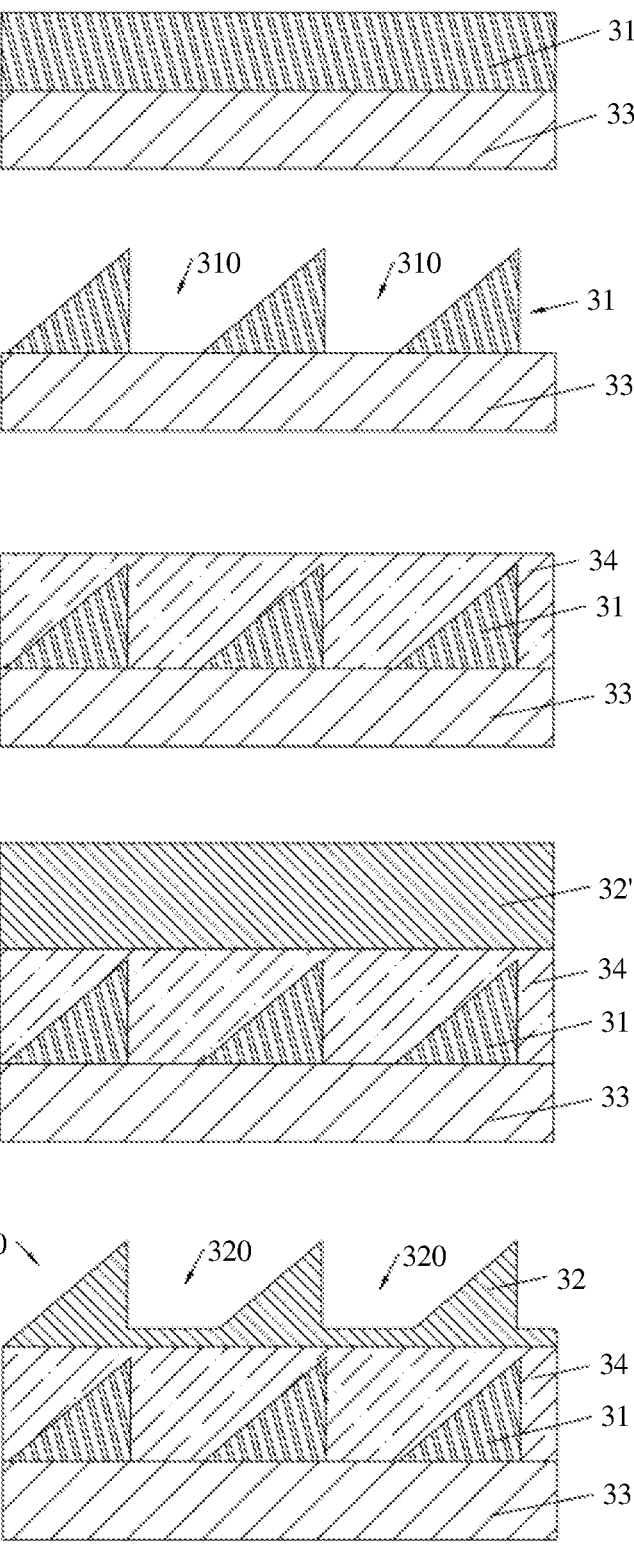
FIG. 22 is a flowchart of a specific process of the manufacturing method shown in FIG. 21.

In this embodiment, the second relief structure 32 is partially embedded in the first slit 310. Specifically, the second relief structure 32 includes a first part 321 and a second part 322 that are arranged in a laminated manner, and the first part 321 is embedded in the first slit 310 of the first relief structure 31 to match the first relief structure 31. It may be understood that, because the refractive index of the second relief structure 32 is different from that of the first relief structure 31, and the first part 321 is embedded in the first slit 310 of the first relief structure 31, it may also be considered that the first part 321 and the first relief structure 31 together form a one-dimensional grating. The first part 321 is also configured to carry the second part 322. In the second relief structure 32, the second part 322 actually performs a dimming function, and the second part 322 forms a one-dimensional grating in the composite grating 30. Certainly, in another embodiment, as shown in FIG. 22, the second relief structure 32 has only a second part 322 that carries the second relief structure 32 through an intermediate layer disposed in the first slit of the first relief structure 31.

In this embodiment, the second relief structure 32 is a blazed grating. It may be understood that the entire second relief structure 32 is a blazed grating, or a part of the relief structure 32 is a blazed grating. In this embodiment, the second part 322 of the relief structure 32 is a blazed grating. The second part 322 of the second relief structure 32 has a period ranging from 300 nm to 900 nm (including 300 nm and 900 nm), a height ranging from 50 nm to 600 nm (including 50 nm and 600 nm), and a duty cycle ranging from 0.1 to 0.9 (including 0.1 and 0.9). The nano-imprint-lithography resist is nano-imprint-lithography resist with a high refractive index, for example, polyorganosiloxane, and the refractive index of the second relief structure 32 is greater than or equal to 1.5 and less than or equal to 2.2. The refractive index of the second relief structure 32 is less than the refractive index of the first relief structure 31. The second relief structure 32 in this embodiment has a high refractive index, which can effectively improve optical efficiency and improve imaging quality of the electronic device 100 including the composite grating 30. The test wavelengths of all refractive index values of the first relief structure 31 and the second relief structure 32 are 587.56 nm.

When the second relief structure 32 is formed, the rotation of the nano-imprint table may be controlled, or clamps with different placement angles may be replaced, or the imprint template may be replaced, so that the included angle θ between the projection, on the reference plane, of the extension direction of the second slit 320 and the projection, on the reference plane, of the extension direction of the first slit 310 is 10 degrees to 90 degrees (including 10 degrees and 90 degrees). It may be understood that an included angle between the projection, on the reference plane, of the extension direction of the second slit 320 and the projection, on the reference plane, of the extension direction of the first slit 310 is equal to an included angle between a projection, on the substrate 33, of the extension direction of the second slit 320 and a projection, on the substrate 33, of the extension direction of the first slit 310.

That is, in this embodiment, the first relief structure 31 and the second relief structure 32 are stacked to form a composite grating 30, where the composite grating 30 is equivalent to an asymmetric two-dimensional grating, so that after the light reaches the composite grating 30, the light is diffracted by the composite grating 30. The light may adjust a diffraction direction in a direction when passing through the first relief structure 31, and then adjust the diffraction direction in another direction when passing through the second relief structure 32, or a part of the light may adjust the diffraction direction in the first relief structure 31, and the other part adjusts the diffraction direction in the second relief structure 32, to implement diffraction direction adjustment and energy distribution of light in two different directions, improve light coupling efficiency, effectively improve brightness and chromaticity uniformity of the light, and improve the imaging effect of the electronic device 100 including the composite grating 30.

It can be understood that although the concept of asymmetric two-dimensional grating is mentioned in the related technology, the asymmetric two-dimensional grating processing is very complicated and the process is very difficult, and even a grating master cannot be made at present. In this application, the first relief structure 31 and the second relief structure 32 are stacked, which may also be understood as two one-dimensional gratings are stacked. In addition, the included angle θ between the projections, on the reference plane, of the extension directions of the two slits of the two one-dimensional gratings is limited to 10 degrees to 90 degrees, so that a composite grating 30 equivalent to an asymmetric two-dimensional grating is formed, and processing difficulty is low, brightness and chromaticity uniformity of the light that is finally projected to the eye are effectively improved, and an imaging effect of the electronic device 100 including the composite grating 30 is improved.

In some implementations, the included angle θ between the projection, on the reference plane, of the extension direction of the second slit 320 and the projection, on the reference plane, of the extension direction of the first slit 310 is 45 degrees to 60 degrees (including 45 degrees and 60 degrees). The included angle θ between the projection, on the reference plane, of the extension direction of the second slit 320 and the projection, on the reference plane, of the extension direction of the first slit 310 is limited to 45 degrees to 60 degrees, so that optical coupling efficiency of the light is maximized, brightness and chromaticity uniformity of the light is effectively improved, and the imaging effect of the electronic device 100 including the composite grating 30 is improved.

Figure 15:
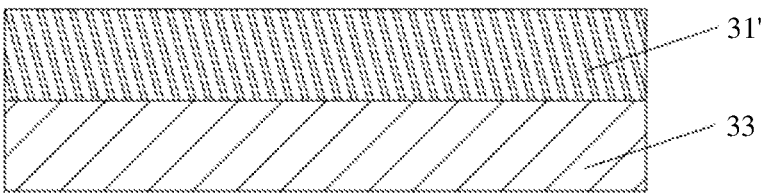
FIG. 15 is a flowchart of a specific process of the manufacturing method shown in FIG. 13 in another implementation.
Figure 15:
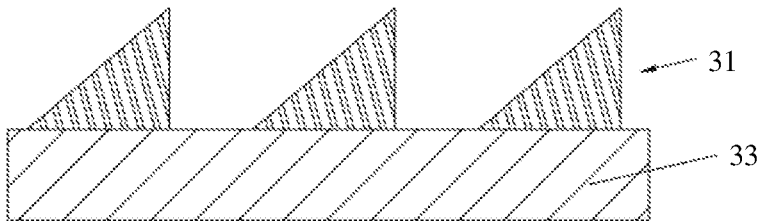
Figure 15:
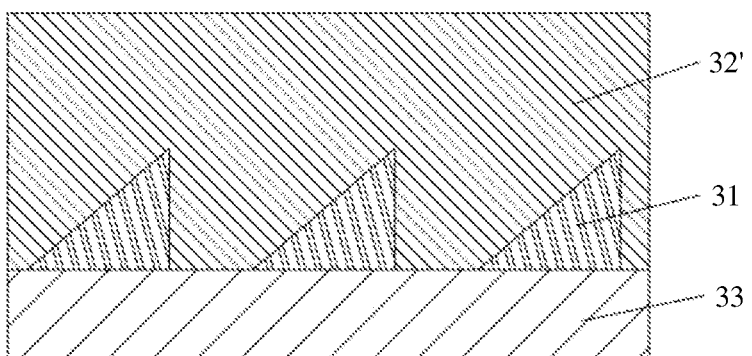
Figure 15:
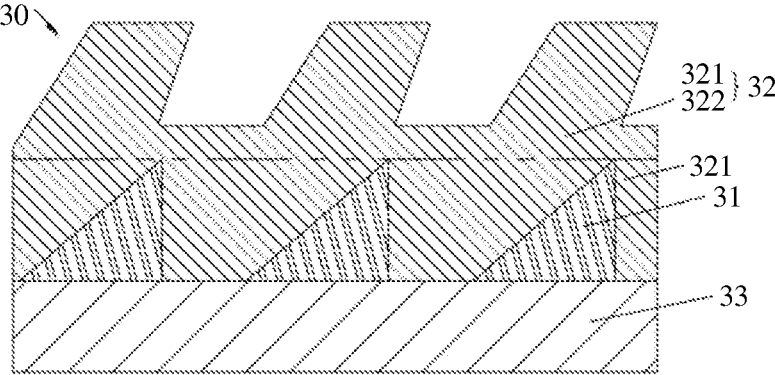
Figure 16:
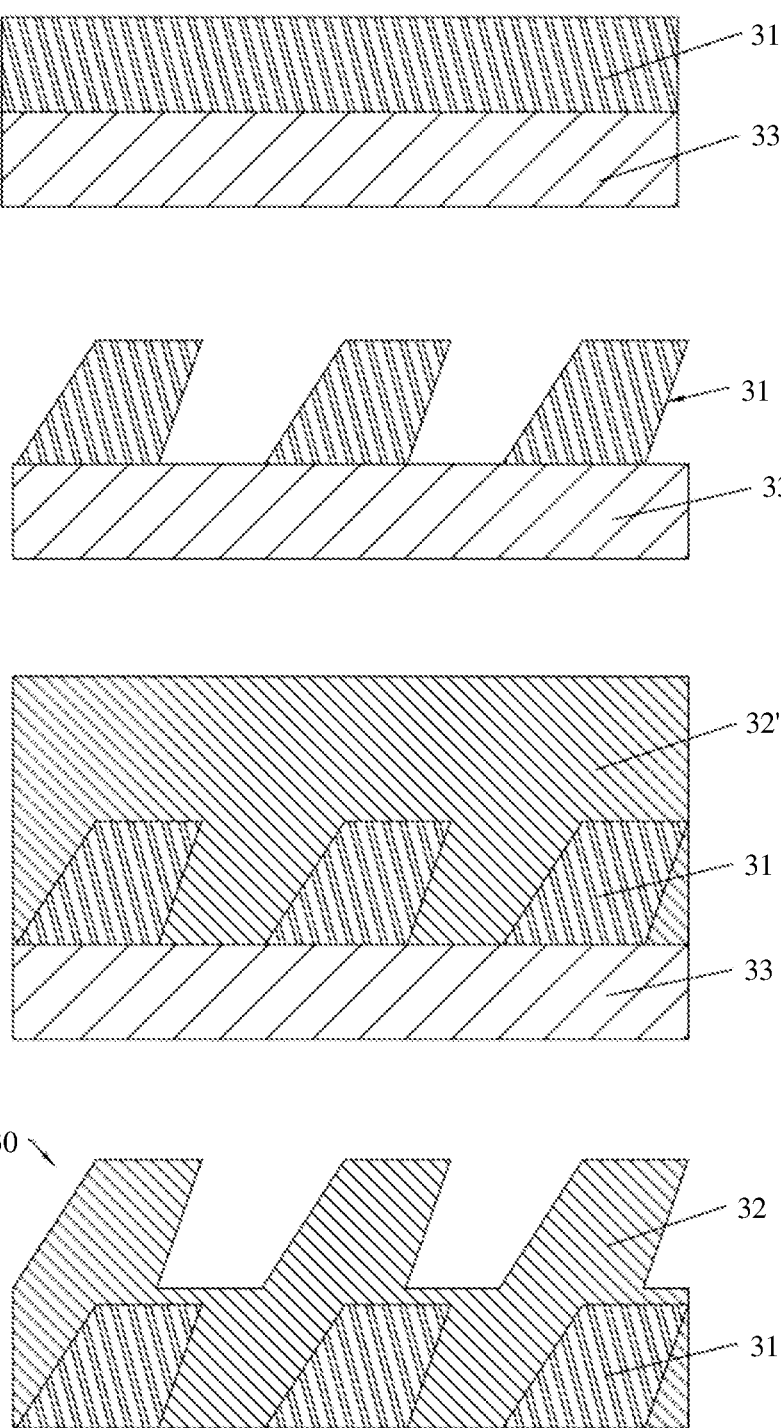
FIG. 16 is a flowchart of a specific process of the manufacturing method shown in FIG. 13 in another implementation.
Figure 17:
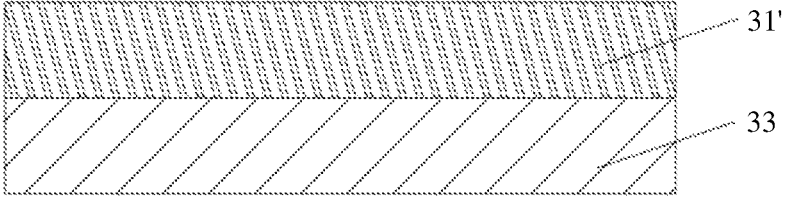
FIG. 17 is a flowchart of a specific process of the manufacturing method shown in FIG. 13 in another implementation.
Figure 17:
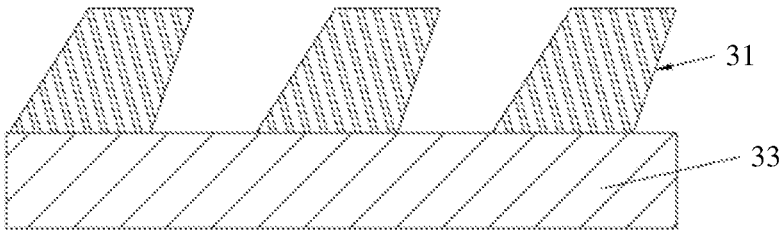
Figure 17:
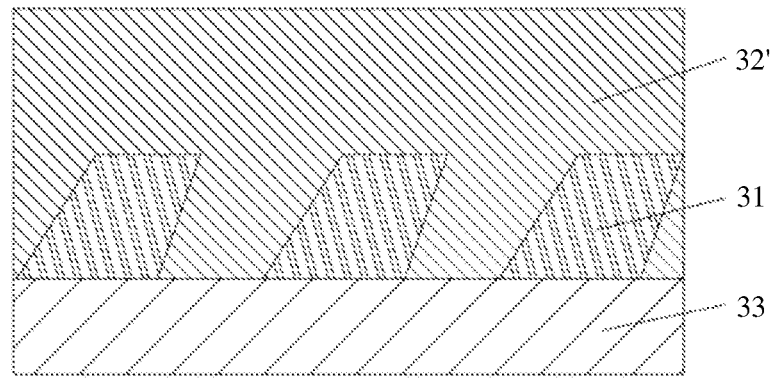
Figure 17:
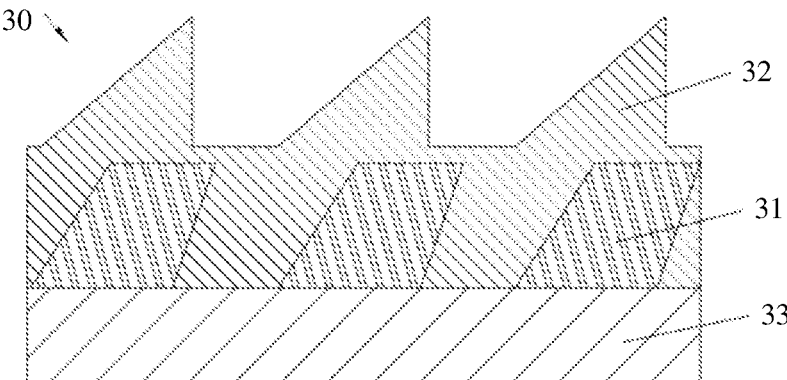

Refer to FIG. 15 to FIG. 17. FIG. 15 is a flowchart of a specific process of the manufacturing method shown in FIG. 13 in another implementation. FIG. 16 is a flowchart of a specific process of the manufacturing method shown in FIG. 13 in another implementation. FIG. 17 is a flowchart of a specific process of the manufacturing method shown in FIG. 13 in another implementation.

Certainly, in a scenario of another embodiment, as shown in FIG. 15, the first relief structure 31 is a blazed grating, and the second relief structure 32 may be an asymmetric grating such as a slanted grating. In another scenario of another embodiment, as shown in FIG. 16, the first relief structure 31 is a slanted grating, and the second relief structure 32 may be an asymmetric grating such as a slanted grating. In still another scenario of another embodiment, as shown in FIG. 17, the first relief structure 31 is a slanted grating, and the second relief structure 32 may be an asymmetric grating such as a blazed grating.

In still another scenario of another embodiment, the material of the second relief structure 32 may further be another material other than the nano-imprint-lithography resist, for example, titanium dioxide, and the refractive index of the second relief structure 32 may further be 1.5 to 2.8 (including 1.5 and 2.8). Alternatively, the refractive index of the second relief structure 32 may be greater than 2.8. The second relief structure 32 may be formed by using a dry etching process, or may be obtained by performing coating on the nano-imprint pattern. The coating manner may be electron beam evaporation, magnetron sputtering, atomic layer deposition, or the like. The second relief structure 32 is formed by coating, which is easier to implement than the dry etching process, and can improve mass production of the product. In still another scenario of another embodiment, a period, a height, and a duty cycle of the second relief structure 32 may be different from a period, a height, and a duty cycle of the first relief structure 31 respectively.

In another embodiment, the method for manufacturing the composite grating 30 may further include forming a third relief structure on a side of the second relief structure 32 that faces away from the first relief structure 31. There may be one or more third relief structures, and the third relief structure may be a blazed grating or a slanted grating. A material of the third relief structure may be nano-imprint-lithography resist, titanium dioxide, or another material. A refractive index of the third relief structure is 1.5 to 2.8 (including 1.5 and 2.8), or a refractive index of the third relief structure may be greater than 2.8. The period, the height, and the duty cycle of the third relief structure may be the same as or different from the period, the height, and the duty cycle of the first relief structure 31 (or the second relief structure 32) respectively.

Figure 18:
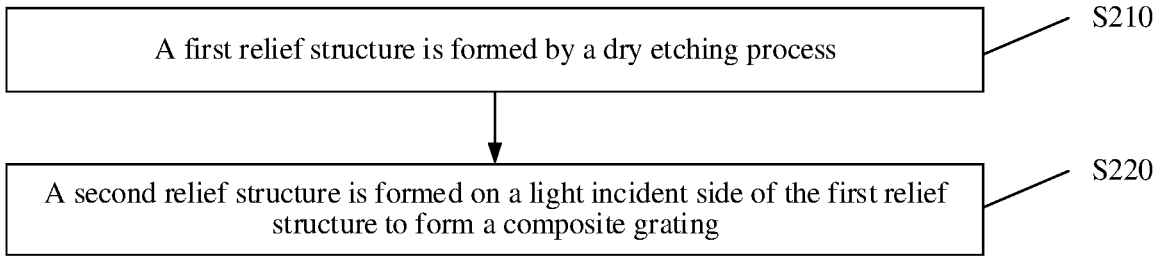
FIG. 18 is a schematic flowchart of another manufacturing method for manufacturing the composite grating shown in FIG. 5 according to an embodiment of this application.

Refer to FIG. 18. FIG. 18 is a schematic flowchart of another manufacturing method for manufacturing the composite grating 30 shown in FIG. 5 according to an embodiment of this application. As shown in FIG. 18, the method for manufacturing the composite grating 30 includes steps S210 to S220 as follows:

S210: Form a first relief structure 31.

Figure 19:
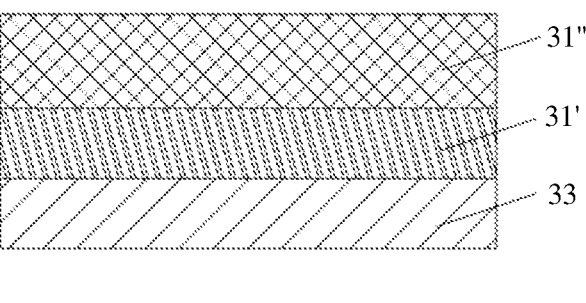
FIG. 19 is a flowchart of a specific process of the manufacturing method shown in FIG. 18.
Figure 19:
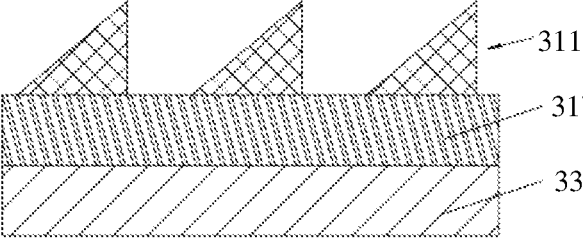
Figure 19:
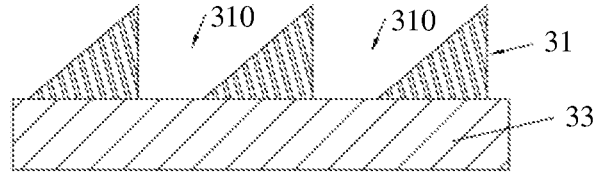
Figure 19:
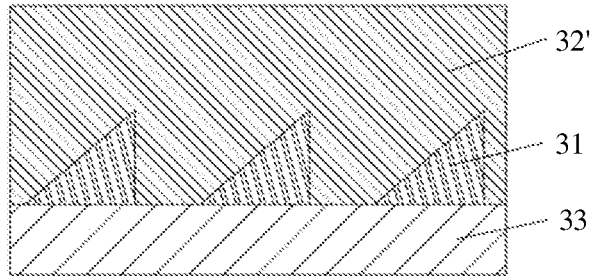
Figure 19:
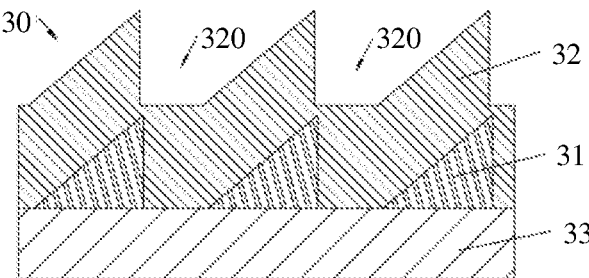

Refer to FIG. 19. FIG. 19 is a flowchart of a specific process of the manufacturing method shown in FIG. 18.

Specifically, forming the first relief structure 31 specifically includes providing a substrate 33, and forming the first relief structure 31 on the substrate 33. The first relief structure 31 includes a plurality of first slits 310 disposed in parallel. In this embodiment, a material of the substrate 33 is glass, and the substrate 33 is configured to carry the first relief structure 31. The material of the first relief structure 31 is titanium dioxide.

As shown in FIG. 19, the first relief structure 31 may be formed by a dry etching process. Specifically, the forming process of the first relief structure 31 is as follows: First, a first plating layer 31' is formed on the substrate 33, a first imprint-lithography resist 31" of a specific thickness is spin-coated on a surface of the first plating layer 31' that faces away from the substrate 33, then an imprint template is pressed onto the first imprint-lithography resist 31" on the nano-imprint device through a nano-imprint process, then the imprint-lithography resist is cured by ultraviolet light and demoulded to obtain a mask 311 of the first relief structure 31, and then the first relief structure 31 is obtained by dry etching of the first plating layer 31'. In this implementation, a refractive index of the first relief structure 31 is greater than or equal to 2.2 and less than or equal to 2.8. A refractive index of the substrate 33 is less than or equal to the refractive index of the first relief structure 31. In this implementation, the refractive index of the first relief structure 31 is higher than a refractive index of a grating whose material is nano-imprint-lithography resist, so that optical efficiency can be improved more effectively.

In this embodiment, the first relief structure 31 is a blazed grating. It may be understood that the entire first relief structure 31 is a blazed grating, or a part of the first relief structure 31 is a blazed grating. In the structure shown in FIG. 19, the entire first relief structure 31 is a blazed grating. The first relief structure 31 has a period ranging from 300 nm to 900 nm (including 300 nm and 900 nm), a height ranging from 50 nm to 600 nm (including 50 nm and 600 nm), and a duty cycle ranging from 0.1 to 0.9 (including 0.1 and 0.9).

Certainly, in a scenario of another embodiment, a material for forming the first relief structure 31 is nano-imprint-lithography resist, and the first relief structure 31 may be formed by using a nano-imprint process. In another scenario of another embodiment, the first relief structure 31 may alternatively be an asymmetric grating such as a slanted grating. When the first relief structure 31 is a slanted grating, a material for forming the first relief structure 31 may be nano-imprint-lithography resist, and the first relief structure 31 may be formed by using a nano-imprint process. The material for forming the first relief structure 31 may alternatively be titanium dioxide, and the first relief structure 31 may be formed by a dry etching or coating process. In still another scenario of another embodiment, the material of the first relief structure 31 may alternatively be another material other than the nano-imprint-lithography resist and the titanium dioxide. The refractive index of the first relief structure 31 may be 1.5 to 2.8 (including 1.5 and 2.8), or the refractive index of the first relief structure 31 may be greater than 2.8.

S220: A second relief structure 32 is formed on a light incident side of the first relief structure 31 to form a composite grating 30. The second relief structure 32 includes a plurality of second slits 320, where the second slit 320 faces away from the first relief structure 31, and a surface of the first relief structure 31 that faces away from the second relief structure 32 is a reference plane. An included angle $\theta$ between a projection, on the reference plane, of an extension direction of the second slit 320 and a projection, on the reference plane, of an extension direction of the first slit 310 is 10 degrees to 90 degrees. Certainly, in another embodiment, the reference plane may alternatively be a surface of the substrate that faces or faces away from the first relief structure 310. Alternatively, the reference plane may be perpendicular to any plane in which a thickness direction of the composite grating 30 is located, and the reference plane may be a virtual plane or a physical plane.

Specifically, as shown in FIG. 19, a specific step of forming the second relief structure 32 is the same as step S120. Refer to step S110. Details are not described herein again. It may be understood that an included angle between a projection, on the reference plane, of the extension direction of the second slit 320 and a projection, on the reference plane, of the extension direction of the first slit 310 is equal to an included angle between a projection, on the substrate 33, of the extension direction of the second slit 320 and a projection, on the substrate 33, of the extension direction of the first slit 310.

That is, in this embodiment, the first relief structure 31 and the second relief structure 32 are stacked to form a composite grating 30, where the composite grating 30 is equivalent to an asymmetric two-dimensional grating, so that after the light reaches the composite grating 30, the light is diffracted by the composite grating 30. The light may adjust a diffraction direction in a direction when passing through the first relief structure 31, and then adjust the diffraction direction in another direction when passing through the second relief structure 32, or a part of the light may adjust the diffraction direction in the first relief structure 31, and the other part adjusts the diffraction direction in the second relief structure 32, to implement diffraction direction adjustment and energy distribution of light in two different directions, improve light coupling efficiency, effectively improve brightness and chromaticity uniformity of the light, and improve the imaging effect of the electronic device 100 including the composite grating 30.

It can be understood that although the concept of asymmetric two-dimensional grating is mentioned in the related technology, the asymmetric two-dimensional grating processing is very complicated and the process is very difficult, and even a grating master cannot be made at present. In this application, the first relief structure 31 and the second relief structure 32 are stacked, which may also be understood as two one-dimensional gratings are stacked. In addition, an included angle θ between projections, on the reference plane, of extension directions of two slits of the two one-dimensional gratings is limited to 10 degrees to 90 degrees, so that a composite grating 30 equivalent to an asymmetric two-dimensional grating is formed, and processing difficulty is low, brightness and chromaticity uniformity of the light that is finally projected to the eye are effectively improved, and an imaging effect of the electronic device 100 including the composite grating 30 is improved.

In some implementations, the included angle θ between the projection, on the reference plane, of the extension direction of the second slit 320 and the projection, on the reference plane, of the extension direction of the first slit 310 is 45 degrees to 60 degrees (including 45 degrees and 60 degrees). The included angle θ between the projection, on the reference plane, of the extension direction of the second slit 320 and the projection, on the reference plane, of the extension direction of the first slit 310 is limited to 45 degrees to 60 degrees, so that optical coupling efficiency of the light is maximized, brightness and chromaticity uniformity of the light is effectively improved, and the imaging effect of the electronic device 100 including the composite grating 30 is improved.

Figure 20:
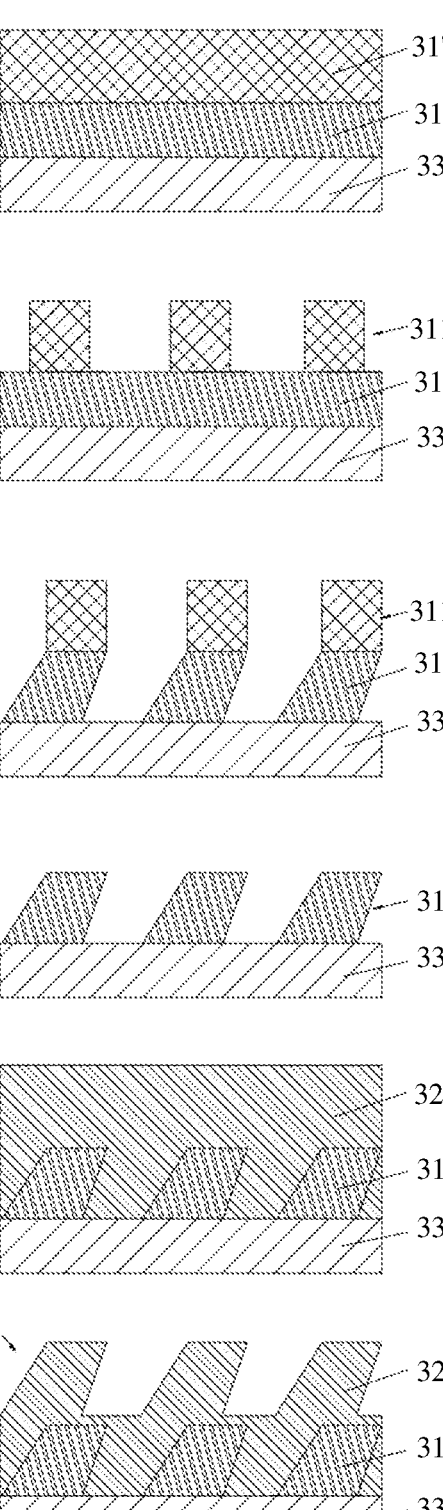
FIG. 20 is a flowchart of a specific process of the manufacturing method shown in FIG. 18 in another implementation.

Refer to FIG. 20. FIG. 20 is a flowchart of a specific process of the manufacturing method shown in FIG. 18 in another implementation.

Certainly, in a scenario of another embodiment, the first relief structure 31 is a blazed grating, and the second relief structure 32 may be an asymmetric grating such as a slanted grating. In another scenario of another embodiment, as shown in FIG. 20, the first relief structure 31 is a slanted grating, and the second relief structure 32 may be an asymmetric grating such as a slanted grating. In still another scenario of another embodiment, the first relief structure 31 is a slanted grating, and the second relief structure 32 may be an asymmetric grating such as a blazed grating.

In still another scenario of another embodiment, the material of the second relief structure 32 may further be another material other than the nano-imprint-lithography resist, for example, titanium dioxide, and the refractive index of the second relief structure 32 may further be 1.5 to 2.8 (including 1.5 and 2.8). Alternatively, the refractive index of the second relief structure 32 may be greater than 2.8. The second relief structure 32 may be formed by using a dry etching process, or may be obtained by performing coating on the nano-imprint pattern. The coating manner may be electron beam evaporation, magnetron sputtering, atomic layer deposition, or the like. The second relief structure 32 is formed by coating, which is easier to implement than the dry etching process, and can improve mass production of the product. In still another scenario of another embodiment, a period, a height, and a duty cycle of the second relief structure 32 may be different from a period, a height, and a duty cycle of the first relief structure 31 respectively.

In another embodiment, the method for manufacturing the composite grating 30 may further include forming a third relief structure on a side of the second relief structure 32 that faces away from the first relief structure 31. There may be one or more third relief structures, and the third relief structure may be a blazed grating or a slanted grating. A material of the third relief structure may be nano-imprint-lithography resist, titanium dioxide, or another material. A refractive index of the third relief structure is 1.5 to 2.8 (including 1.5 and 2.8), or a refractive index of the third relief structure may be greater than 2.8. The period, the height, and the duty cycle of the third relief structure may be the same as or different from the period, the height, and the duty cycle of the first relief structure 31 (or the second relief structure 32) respectively.

Figure 21:
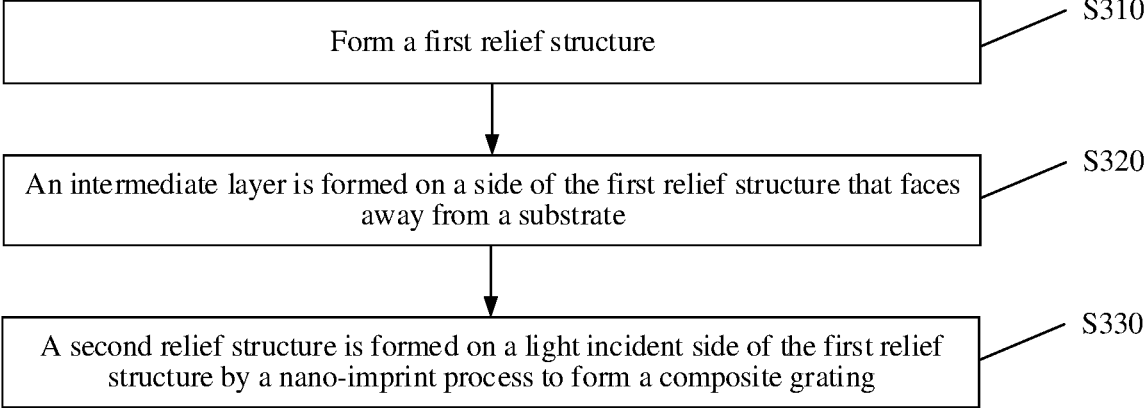
FIG. 21 is a schematic flowchart of a manufacturing method for manufacturing the composite grating shown in FIG. 10 according to an embodiment of this application.

Refer to FIG. 21. FIG. 21 is a schematic flowchart of a manufacturing method for manufacturing the composite grating 30 shown in FIG. 10 according to an embodiment of this application. As shown in FIG. 21, the method for manufacturing the composite grating 30 includes steps S310 to S330 as follows.

S310: Form a first relief structure 31.

Specifically, a specific step of forming the first relief structure 31 is the same as step S110. Refer to step S110. Details are not described herein again.

S320: An intermediate layer 34 is formed on a side of the first relief structure 31 that faces away from the substrate 33.

Refer to FIG. 22. FIG. 22 is a flowchart of a specific process of the manufacturing method shown in FIG. 21.

Specifically, a refractive index of the intermediate layer 34 is less than a refractive index of the first imprint-lithography resist 31'. As shown in FIG. 22, an intermediate material layer of a specific thickness is spin-coated on a side of the first relief structure 31 that faces away from the substrate 33, and the intermediate layer 34 is formed after the intermediate material layer is cured.

S330: A second relief structure 32 is formed on a light incident side of the first relief structure 31 to form a composite grating 30. The second relief structure 32 includes a plurality of second slits 320, where the second slit 320 faces away from the first relief structure 31, and a surface of the first relief structure 31 that faces away from the second relief structure 32 is a reference plane. An included angle θ between a projection, on the reference plane, of the extension direction of the second slit 320 and a projection, on the reference plane, of the extension direction of the first slit 310 is 10 degrees to 90 degrees. Certainly, in another embodiment, the reference plane may alternatively be a surface of the substrate that faces or faces away from the first relief structure 310. Alternatively, the reference plane may be perpendicular to any plane in which a thickness direction of the composite grating 30 is located, and the reference plane may be a virtual plane or a physical plane.

Specifically, a second relief structure 32 is formed on the side of the intermediate layer 34 that faces away from the first relief structure 31. Specifically, in this embodiment, the second relief structure 32 may be formed on the surface of the intermediate layer 34 that faces away from the first relief structure 31 through a nano-imprint process, and the second relief structure 32 may alternatively be formed on the surface of the intermediate layer 34 through dry etching. The second relief structure 32 may alternatively be formed on the side of the intermediate layer 34 that faces away from the first relief structure 31 by a coating process.

For example, as shown in FIG. 22, the second relief structure 32 is formed on the surface of the intermediate layer 34 that faces away from the first relief structure 31 by a nano-imprint process. Specifically, the material of the second relief structure 32 is nano-imprint-lithography resist, and a second imprint-lithography resist 32' of a specific thickness is spin-coated on a side of the intermediate layer 34 that faces away from the first relief structure 31, and then the second relief structure 32 is obtained by using a process such as nano-imprint, ultraviolet curing, demoulding, and the like, to form a composite grating 30. The second relief structure 32 is formed by a nano-imprint process, which is simple and easy to achieve mass production.

In this embodiment, the second relief structure 32 is a blazed grating. It may be understood that the entire second relief structure 32 is a blazed grating. The second relief structure 32 has a period ranging from 300 nm to 900 nm (including 300 nm and 900 nm), a height ranging from 50 nm to 600 nm (including 50 nm and 600 nm), and a duty cycle ranging from 0.1 to 0.9 (including 0.1 and 0.9). The refractive index of the second relief structure 32 is greater than or equal to 1.5 and less than or equal to 2.8. The refractive index of the second relief structure 32 is less than or equal to the refractive index of the first relief structure 31. The second relief structure 32 in this embodiment has a high refractive index, which can effectively improve optical efficiency and improve imaging quality of the electronic device 100 which applies the composite grating 30. The test wavelengths of all refractive index values of the first relief structure 31 and the second relief structure 32 are 587.56 nm.

When the second relief structure 32 is formed, clamps with different placement angles may be replaced, or the imprint template may be replaced, so that the included angle θ between the projection, on the reference plane, of the extension direction of the second slit 320 and the projection, on the reference plane, of the extension direction of the first slit 310 is 10 degrees to 90 degrees (including 10 degrees and 90 degrees), to form the composite grating 30. It may be understood that the included angle between the projection, on the reference plane, of the extension direction of the second slit 320 and the projection, on the reference plane, of the extension direction of the first slit 310 is equal to an included angle between a projection, on the substrate 33, of the extension direction of the second slit 320 and a projection, on the substrate 33, of the extension direction of the first slit 310.

That is, in this embodiment, the first relief structure 31 and the second relief structure 32 are stacked to form a composite grating 30, where the composite grating 30 is equivalent to an asymmetric two-dimensional grating, so that after the light reaches the composite grating 30, the light is diffracted by the composite grating 30. The light may adjust a diffraction direction in a direction when passing through the first relief structure 31, and then adjust the diffraction direction in another direction when passing through the second relief structure 32, or a part of the light may adjust the diffraction direction in the first relief structure 31, and the other part adjusts the diffraction direction in the second relief structure 32, to implement diffraction direction adjustment and energy distribution of light in two different directions, improve light coupling efficiency, effectively improve brightness and chromaticity uniformity of the light, and improve the imaging effect of the electronic device 100 including the composite grating 30.

It can be understood that although the concept of asymmetric two-dimensional grating is mentioned in the related technology, the asymmetric two-dimensional grating processing is very complicated and the process is very difficult, and even a grating master cannot be made at present. In this application, the first relief structure 31 and the second relief structure 32 are stacked, which may also be understood as two one-dimensional gratings are stacked. In addition, an included angle θ between projections, on the reference plane, of extension directions of two slits of the two one-dimensional gratings is limited to 10 degrees to 90 degrees, so that a composite grating 30 equivalent to an asymmetric two-dimensional grating is formed, and processing difficulty is low, brightness and chromaticity uniformity of the light that is finally projected to the eye are effectively improved, and an imaging effect of the electronic device 100 including the composite grating 30 is improved.

In some implementations, the included angle θ between the projection, on the reference plane, of the extension direction of the second slit 320 and the projection, on the reference plane, of the extension direction of the first slit 310 is 45 degrees to 60 degrees (including 45 degrees and 60 degrees). The included angle θ between the projection, on the reference plane, of the extension direction of the second slit 320 and the projection, on the reference plane, of the extension direction of the first slit 310 is limited to 45 degrees to 60 degrees, so that optical coupling efficiency of the light is maximized, brightness and chromaticity uniformity of the light is effectively improved, and the imaging effect of the electronic device 100 including the composite grating 30 is improved.

Figure 23:
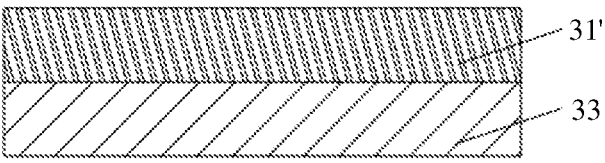
FIG. 23 is a flowchart of a specific process of the manufacturing method shown in FIG. 21 in another implementation.
Figure 23:
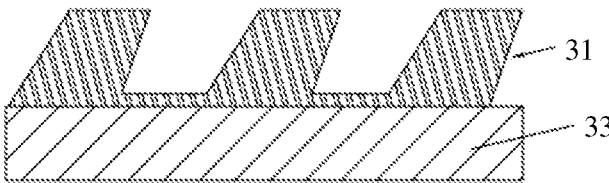
Figure 23:
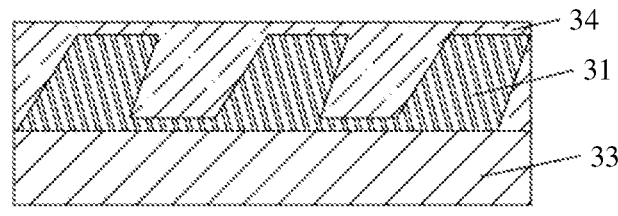
Figure 23:
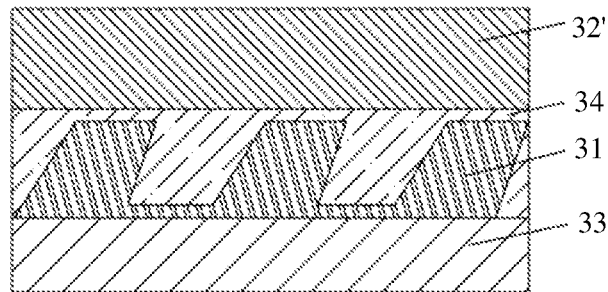
Figure 23:
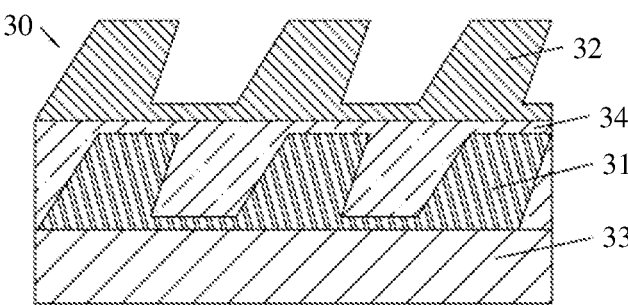

Refer to FIG. 23. FIG. 23 is a flowchart of a specific process of the manufacturing method shown in FIG. 21 in another implementation.

Certainly, in a scenario of another embodiment, the first relief structure 31 is a blazed grating, and the second relief structure 32 may be an asymmetric grating such as a slanted grating. In another scenario of another embodiment, as shown in FIG. 23, the first relief structure 31 is a slanted grating, and the second relief structure 32 may be an asymmetric grating such as a slanted grating. In still another scenario of another embodiment, the first relief structure 31 is a slanted grating, and the second relief structure 32 may be an asymmetric grating such as a blazed grating.

In still another scenario of another embodiment, the material of the second relief structure 32 may further be another material other than the nano-imprint-lithography resist, for example, titanium dioxide, and the refractive index of the second relief structure 32 may alternatively be greater than 2.8. The second relief structure 32 may be formed by using a dry etching process, or may be obtained by performing coating on the nano-imprint pattern. The coating manner may be electron beam evaporation, magnetron sputtering, atomic layer deposition, or the like. The second relief structure 32 is formed by coating, which is easier to implement than the dry etching process, and can improve mass production of the product. In still another scenario of another embodiment, a period, a height, and a duty cycle of the second relief structure 32 may be different from a period, a height, and a duty cycle of the first relief structure 31 respectively.

In another embodiment, the method for manufacturing the composite grating 30 may further include forming a third relief structure on a side of the second relief structure 32 that faces away from the first relief structure 31. There may be one or more third relief structures, and the third relief structure may be a blazed grating or a slanted grating. A material of the third relief structure may be nano-imprint-lithography resist, titanium dioxide, or another material. A refractive index of the third relief structure is 1.5 to 2.8 (including 1.5 and 2.8), or a refractive index of the third relief structure may be greater than 2.8. The period, the height, and the duty cycle of the third relief structure may be the same as or different from the period, the height, and the duty cycle of the first relief structure 31 (or the second relief structure 32) respectively.

Figure 24:
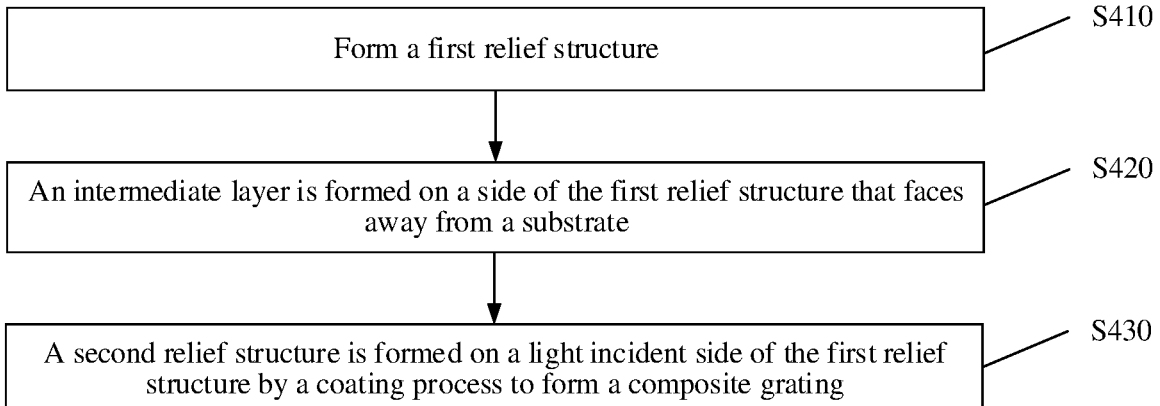
FIG. 24 is a schematic flowchart of a manufacturing method for manufacturing the composite grating shown in FIG. 11 according to an embodiment of this application.

Refer to FIG. 24. FIG. 24 is a schematic flowchart of a manufacturing method for manufacturing the composite grating 30 shown in FIG. 11 according to an embodiment of this application. As shown in FIG. 24, the method for manufacturing the composite grating 30 includes steps S410 to S430 as follows.

S410: Form a first relief structure 31.

Figure 25:
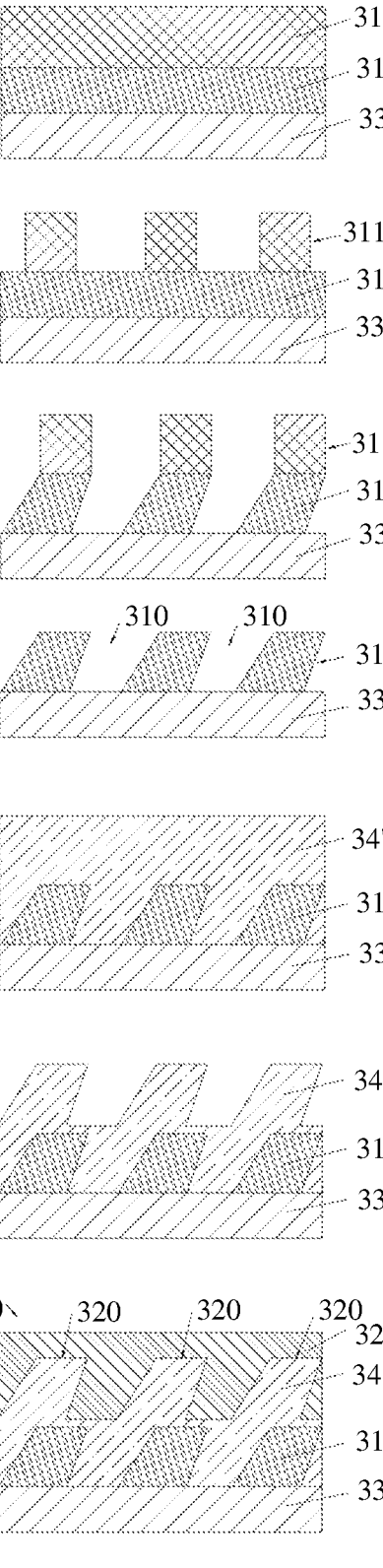
FIG. 25 is a flowchart of a specific process of the manufacturing method shown in FIG. 24.

Refer to FIG. 25. FIG. 25 is a flowchart of a specific process of the manufacturing method shown in FIG. 24.

Specifically, as shown in FIG. 25, a specific step of forming the first relief structure 31 is roughly the same as step S210. Refer to step S210. Details are not described herein again. Different from step S210, the first relief structure 31 in this application is a slanted grating. Certainly, in another embodiment, the first relief structure 31 may alternatively be an asymmetric grating such as a blazed grating.

S420: An intermediate layer 34 is formed on a side of the first relief structure 31 that faces away from the substrate 33.

Specifically, a refractive index of the intermediate layer 34 is less than a refractive index of the first imprint-lithography resist 31'. Refer to FIG. 25. An intermediate material layer 34' of a specific thickness is spin-coated on the side of the first relief structure 31 that faces away from the substrate 33, where the intermediate material layer 34' is nano-imprint-lithography resist, an imprint template is pressed onto the intermediate material layer 34' on the nano-imprint device through the nano-imprint process, then the intermediate material layer 34' is cured by ultraviolet light, and the intermediate layer 34 is formed after demould-ing. The intermediate layer 34 serves as a template to assist the forming of the second relief structure 32.

S430: A second relief structure 32 is formed on a light incident side of the first relief structure 31 to form a composite grating 30. The second relief structure 32 includes a plurality of second slits 320, where the second slit 320 faces away from the first relief structure 31, and a surface of the first relief structure 31 that faces away from the second relief structure 32 is a reference plane. An included angle θ between a projection, on the reference plane, of the extension direction of the second slit 320 and a projection, on the reference plane, of the extension direc-tion of the first slit 310 is 10 degrees to 90 degrees. Certainly, in another embodiment, the reference plane may alterna-tively be a surface of the substrate that faces or faces away from the first relief structure 310. Alternatively, the reference plane may be perpendicular to any plane in which a thickness direction of the composite grating 30 is located, and the reference plane may be a virtual plane or a physical plane.

Specifically, a second relief structure 32 is formed on the side of the intermediate layer 34 that faces away from the first relief structure 31. Specifically, in this embodiment, the second relief structure 32 may be formed on the surface of the intermediate layer 34 that faces away from the first relief structure 31 through a nano-imprint process, and the second relief structure 32 may alternatively be formed on the surface of the intermediate layer 34 through dry etching. The second relief structure 32 may alternatively be formed on the side of the intermediate layer 34 that faces away from the first relief structure 31 by a coating process.

For example, as shown in FIG. 25, the second relief structure 32 is formed on a side of the intermediate layer 34 that faces away from the first relief structure 31 by a coating process. Specifically, the material of the second relief struc-ture 32 is titanium dioxide, the intermediate layer 34 is an auxiliary pattern of the second relief structure 32, and a side of the intermediate layer 34 that faces away from the first relief structure 31 is coated to obtain the second relief structure 32, to form the composite grating 30. The coating method may be electron beam evaporation, magnetron sput-tering, atomic layer deposition, electroplating, and the like.

In this embodiment, the second relief structure 32 is a slanted grating. It may be understood that the entire second relief structure 32 is a slanted grating. The intermediate layer 34 is located between the first relief structure 31 and the second relief structure 32, which may be understood as that the second slit 320 faces away from the first relief structure 31. The second relief structure 32 has a period ranging from 300 nm to 900 nm (including 300 nm and 900 nm), a height ranging from 50 nm to 600 nm (including 50 nm and 600 nm), and a duty cycle ranging from 0.1 to 0.9 (including 0.1 and 0.9). The refractive index of the second relief structure 32 is greater than or equal to 1.5 and less than or equal to 2.8. The refractive index of the second relief structure 32 is less than or equal to the refractive index of the first relief structure 31. The second relief structure 32 in this embodi-ment has a high refractive index, which can effectively improve optical efficiency and improve imaging quality of the electronic device 100 which applies the composite grating 30. The test wavelengths of all refractive index values of the first relief structure 31 and the second relief structure 32 are 587.56 nm.

When the second relief structure 32 is formed, clamps with different placement angles may be replaced, or the imprint template may be replaced, so that the included angle θ between the projection, on the reference plane, of the extension direction of the second slit 320 and the projection, on the reference plane, of the extension direction of the first slit 310 is 10 degrees to 90 degrees (including 10 degrees and 90 degrees), to form the composite grating 30. It may be understood that the included angle between a projection, on the reference plane, of the extension direction of the second slit 320 and the projection, on the reference plane, of the extension direction of the first slit 310 is equal to an included angle between a projection, on the substrate 33, of the extension direction of the second slit 320 and a projection, on the substrate 33, of the extension direction of the first slit 310.

That is, in this embodiment, the first relief structure 31 and the second relief structure 32 are stacked to form a composite grating 30, where the composite grating 30 is equivalent to an asymmetric two-dimensional grating, so that after the light reaches the composite grating 30, the light is diffracted by the composite grating 30. The light may adjust a diffraction direction in a direction when passing through the first relief structure 31, and then adjust the diffraction direction in another direction when passing through the second relief structure 32, or a part of the light may adjust the diffraction direction in the first relief structure 31, and the other part adjusts the diffraction direction in the second relief structure 32, to implement diffraction direction adjustment and energy distribution of light in two different directions, improve light coupling efficiency, effectively improve brightness and chromaticity uniformity of the light, and improve the imaging effect of the electronic device 100 including the composite grating 30.

It can be understood that although the concept of asymmetric two-dimensional grating is mentioned in the related technology, the asymmetric two-dimensional grating processing is very complicated and the process is very difficult, and even a grating master cannot be made at present. In this application, the first relief structure 31 and the second relief structure 32 are stacked, which may also be understood as two one-dimensional gratings are stacked. In addition, an included angle θ between projections, on the reference plane, of extension directions of two slits of the two one-dimensional gratings is limited to 10 degrees to 90 degrees, so that a composite grating 30 equivalent to an asymmetric two-dimensional grating is formed, and processing difficulty is low, brightness and chromaticity uniformity of the light that is finally projected to the eye are effectively improved, and an imaging effect of the electronic device 100 including the composite grating 30 is improved. The second relief structure 32 is formed by coating, which is easier to implement than the dry etching process, and can improve mass production of the product.

In some implementations, the included angle θ between the projection, on the reference plane, of the extension direction of the second slit 320 and the projection, on the reference plane, of the extension direction of the first slit 310 is 45 degrees to 60 degrees (including 45 degrees and 60 degrees). The included angle θ between the projection, on the reference plane, of the extension direction of the second slit 320 and the projection, on the reference plane, of the extension direction of the first slit 310 is limited to 45 degrees to 60 degrees, so that optical coupling efficiency of the light is maximized, brightness and chromaticity uniformity of the light is effectively improved, and the imaging effect of the electronic device 100 including the composite grating 30 is improved.

Figure 26:
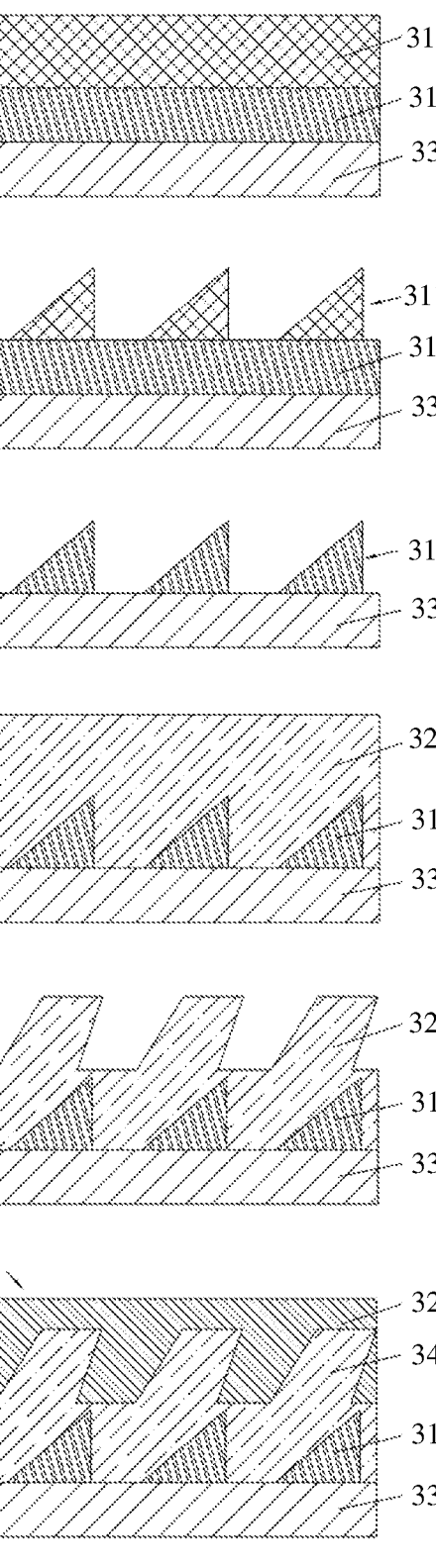
FIG. 26 is a flowchart of a specific process of the manufacturing method shown in FIG. 24 in another implementation.

Refer to FIG. 26. FIG. 26 is a flowchart of a specific process of the manufacturing method shown in FIG. 24 in another implementation.

Certainly, in a scenario of another embodiment, as shown in FIG. 26, the first relief structure 31 is a blazed grating, and the second relief structure 32 may be an asymmetric grating such as a slanted grating. In another scenario of another embodiment, the first relief structure 31 is a blazed grating, and the second relief structure 32 may be an asymmetric grating such as a blazed grating. In still another scenario of another embodiment, the first relief structure 31 is a slanted grating, and the second relief structure 32 may be an asymmetric grating such as a blazed grating.

In still another scenario of another embodiment, a material of the second relief structure 32 may alternatively be another material other than titanium dioxide, and a refractive index of the second relief structure 32 may alternatively be greater than 2.8. The second relief structure 32 may be formed by a dry etching process, or may be formed by a nano-imprint process, or the like. In still another scenario of another embodiment, a period, a height, and a duty cycle of the second relief structure 32 may be different from a period, a height, and a duty cycle of the first relief structure 31 respectively.

In another embodiment, the method for manufacturing the composite grating 30 may further include forming a third relief structure on a side of the second relief structure 32 that faces away from the first relief structure 31. There may be one or more third relief structures, and the third relief structure may be a blazed grating or a slanted grating. A material of the third relief structure may be nano-imprint-lithography resist, titanium dioxide, or another material. A refractive index of the third relief structure is 1.5 to 2.8 (including 1.5 and 2.8), or a refractive index of the third relief structure may be greater than 2.8. The period, the height, and the duty cycle of the third relief structure may be the same as or different from the period, the height, and the duty cycle of the first relief structure 31 (or the second relief structure 32) respectively.

Figure 27:
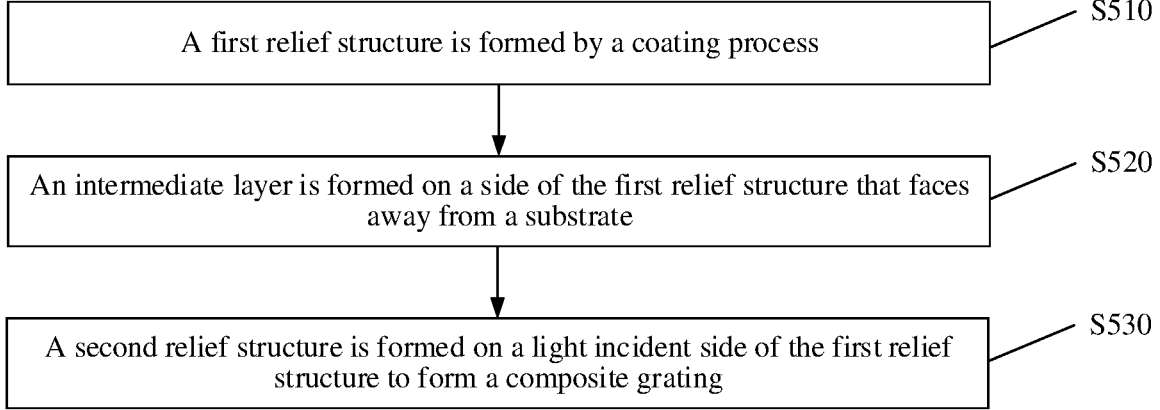
FIG. 27 is a schematic flowchart of a manufacturing method for manufacturing the composite grating shown in FIG. 12 according to an embodiment of this application.

Refer to FIG. 27. FIG. 27 is a schematic flowchart of a manufacturing method for manufacturing the composite grating 30 shown in FIG. 12 according to an embodiment of this application. As shown in FIG. 27, the method for manufacturing the composite grating 30 includes steps S510 to S530 as follows.

S510: Form a first relief structure 31.

Figure 28:
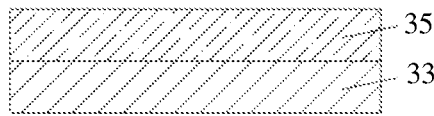
FIG. 28 is a flowchart of a specific process of the manufacturing method shown in FIG. 27.
Figure 28:
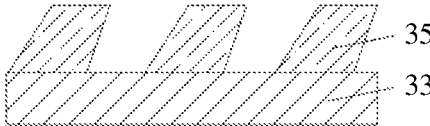
Figure 28:
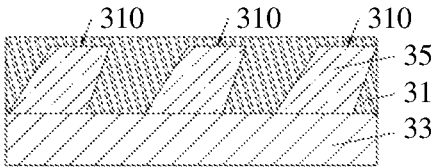
Figure 28:
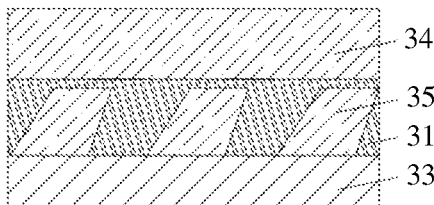
Figure 28:
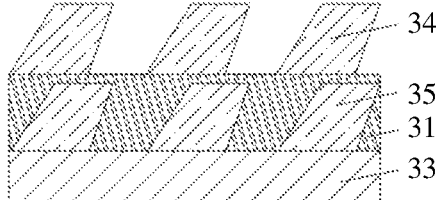
Figure 28:
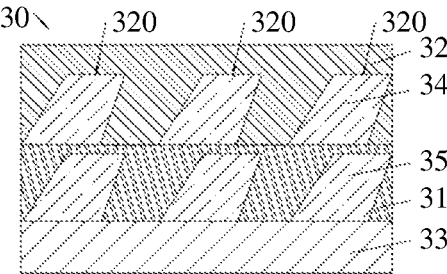

Refer to FIG. 28. FIG. 28 is a flowchart of a specific process of the manufacturing method shown in FIG. 27.

Specifically, forming the first relief structure 31 specifically includes providing a substrate 33, forming an auxiliary layer 35 on the substrate 33, and forming the first relief structure 31 on a side of the auxiliary layer 35 that faces away from the substrate 33. The first relief structure 31 includes a plurality of first slits 310 disposed in parallel. An auxiliary adhesive layer 35' of a specific thickness is spin-coated on the substrate 33, and the auxiliary adhesive layer 35' is nano-imprint-lithography resist. Then, an imprint template is pressed on the auxiliary adhesive layer 35' on a nano-imprint device through a nano-imprint process. Then, the auxiliary adhesive layer 35' is cured by ultraviolet light, and the auxiliary layer 35 is formed after demoulding. The auxiliary layer 35 serves as a template for assisting in forming the first relief structure 31. Then, the first relief structure 31 is formed on the surface of the auxiliary layer 35 that faces away from the substrate 33 by a coating process. The coating material is titanium dioxide, and the coating method may be electron beam evaporation, magnetron sputtering, atomic layer deposition, electroplating, and the like.

In this embodiment, a material of the substrate 33 is glass, and the substrate 33 is configured to carry the first relief structure 31. The entire first relief structure 31 is a slanted grating. The first relief structure 31 has a period ranging from 300 nm to 900 nm (including 300 nm and 900 nm), a height ranging from 50 nm to 600 nm (including 50 nm and 600 nm), and a duty cycle ranging from 0.1 to 0.9 (including 0.1 and 0.9).

In this implementation, a refractive index of the first relief structure 31 is greater than or equal to 2.2 and less than or equal to 2.8. A refractive index of the substrate 33 is less than or equal to the refractive index of the first relief structure 31. The refractive index of the auxiliary layer 35 is less than the refractive index of the first relief structure 31. In this implementation, the refractive index of the first relief structure 31 is higher than a refractive index of a grating whose material is nano-imprint-lithography resist, so that optical efficiency can be improved more effectively.

Certainly, in a scenario of another embodiment, the first relief structure 31 may alternatively be an asymmetric grating such as a blazed grating. In still another scenario of another embodiment, a material of the first relief structure 31 may alternatively be nano-imprint-lithography resist, or another material other than the nano-imprint-lithography resist and titanium dioxide. The refractive index of the first relief structure 31 may be 1.5 to 2.8 (including 1.5 and 2.8), or the refractive index of the first relief structure 31 may be greater than 2.8.

S520: An intermediate layer 34 is formed on a side of the first relief structure 31 that faces away from the substrate 33.

Specifically, as shown in FIG. 28, the intermediate material layer 34' is spin-coated on the side of the first relief structure 31 that faces away from the substrate 33, where the intermediate material layer 34' may be the same nano-imprint-lithography resist as the auxiliary layer 35, then an imprint template is pressed onto the intermediate material layer 34' on the nano-imprint device through the nano-imprint process, then the intermediate material layer 34' is cured by ultraviolet light, and the intermediate layer 34 is formed after demoulding. The intermediate layer 34 serves as a template for assisting in forming the second relief structure 32.

S530: A second relief structure 32 is formed on a light incident side of the first relief structure 31 to form a composite grating 30. The second relief structure 32 includes a plurality of second slits 320, where the second slit 320 faces away from the first relief structure 31, and a surface of the first relief structure 31 that faces away from the second relief structure 32 is a reference plane. An included angle θ between a projection, on the reference plane, of an extension direction of the second slit 320 and a projection, on the reference plane, of an extension direction of the first slit 310 is 10 degrees to 90 degrees. Certainly, in another embodiment, the reference plane may alternatively be a surface of the substrate that faces or faces away from the first relief structure 310. Alternatively, the reference plane may be perpendicular to any plane in which a thickness direction of the composite grating 30 is located, and the reference plane may be a virtual plane or a physical plane.

Specifically, as shown in FIG. 28, a second relief structure 32 is formed on the side of the intermediate layer 34 that faces away from the first relief structure 31. Specifically, in this embodiment, the second relief structure 32 is formed on a side of the intermediate layer 34 that faces away from the first relief structure 31 by a coating process. A second relief structure 32 is obtained by coating a side of the intermediate layer 34 that faces away from the first relief structure 31, to form a composite grating 30. The coating material is titanium dioxide, and the coating manner may be electron beam evaporation, magnetron sputtering, atomic layer deposition, electroplating, or the like.

In this embodiment, the second relief structure 32 is a slanted grating. It may be understood that the entire second relief structure 32 is a slanted grating. The intermediate layer 34 is located between the first relief structure 31 and the second relief structure 32, which may be understood as that the second slit 320 faces away from the first relief structure 31. The second relief structure 32 has a period ranging from 300 nm to 900 nm (including 300 nm and 900 nm), a height ranging from 50 nm to 600 nm (including 50 nm and 600 nm), and a duty cycle ranging from 0.1 to 0.9 (including 0.1 and 0.9). The refractive index of the second relief structure 32 is greater than or equal to 1.5 and less than or equal to 2.8.

The refractive index of the second relief structure 32 is less than or equal to the refractive index of the first relief structure 31. The second relief structure 32 in this embodiment has a high refractive index, which can effectively improve optical efficiency and improve imaging quality of the electronic device 100 which applies the composite grating 30. The test wavelengths of all refractive index values of the first relief structure 31 and the second relief structure 32 are 587.56 nm.

When the second relief structure 32 is formed, clamps with different placement angles may be replaced, or the imprint template may be replaced, so that the included angle θ between the projection, on the reference plane, of the extension direction of the second slit 320 and the projection, on the reference plane, of the extension direction of the first slit 310 is 10 degrees to 90 degrees (including 10 degrees and 90 degrees), to form the composite grating 30. It may be understood that the included angle between a projection, on the reference plane, of the extension direction of the second slit 320 and the projection, on the reference plane, of the extension direction of the first slit 310 is equal to an included angle between a projection, on the substrate 33, of the extension direction of the second slit 320 and a projection, on the substrate 33, of the extension direction of the first slit 310.

That is, in this embodiment, the first relief structure 31 and the second relief structure 32 are stacked to form a composite grating 30, where the composite grating 30 is equivalent to an asymmetric two-dimensional grating, so that after the light reaches the composite grating 30, the light is diffracted by the composite grating 30. The light may adjust a diffraction direction in a direction when passing through the first relief structure 31, and then adjust the diffraction direction in another direction when passing through the second relief structure 32, or a part of the light may adjust the diffraction direction in the first relief structure 31, and the other part adjusts the diffraction direction in the second relief structure 32, to implement diffraction direction adjustment and energy distribution of light in two different directions, improve light coupling efficiency, effectively improve brightness and chromaticity uniformity of the light, and improve the imaging effect of the electronic device 100 including the composite grating 30.

It can be understood that although the concept of asymmetric two-dimensional grating is mentioned in the related technology, the asymmetric two-dimensional grating processing is very complicated and the process is very difficult, and even a grating master cannot be made at present. In this application, the first relief structure 31 and the second relief structure 32 are stacked, which may also be understood as two one-dimensional gratings are stacked. In addition, included angle θ between projections, on the reference plane, of extension directions of two slits of the two one-dimensional gratings is limited to 10 degrees to 90 degrees, so that a composite grating 30 equivalent to an asymmetric two-dimensional grating is formed, and processing difficulty is low, brightness and chromaticity uniformity of the light that is finally projected to the eye are effectively improved, and an imaging effect of the electronic device 100 including the composite grating 30 is improved.

In some implementations, the included angle θ between the projection, on the reference plane, of the extension direction of the second slit 320 and the projection, on the reference plane, of the extension direction of the first slit 310 is 45 degrees to 60 degrees (including 45 degrees and 60 degrees). The included angle θ between the projection, on the reference plane, of the extension direction of the second slit 320 and the projection, on the reference plane, of the extension direction of the first slit 310 is limited to 45 degrees to 60 degrees, so that optical coupling efficiency of the light is maximized, brightness and chromaticity uniformity of the light is effectively improved, and the imaging effect of the electronic device 100 including the composite grating 30 is improved.

Figure 29:
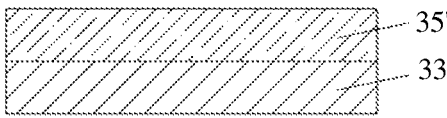
FIG. 29 is a flowchart of a specific process of a manufacturing method of another implementation shown in FIG. 27.
Figure 29:
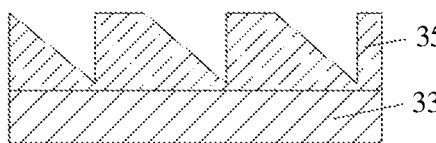
Figure 29:
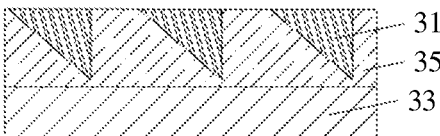
Figure 29:
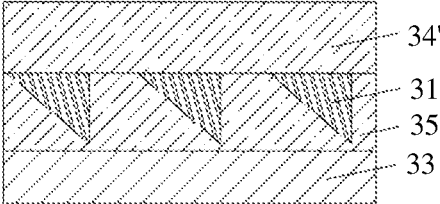
Figure 29:
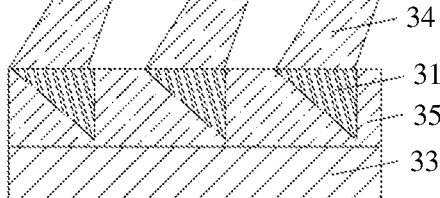
Figure 29:
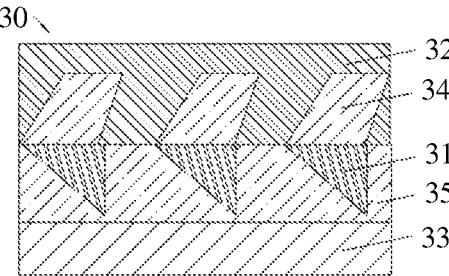

Refer to FIG. 29. FIG. 29 is a flowchart of a specific process of a manufacturing method of another implementation shown in FIG. 27.

Certainly, in a scenario of another embodiment, as shown in FIG. 29, when the first relief structure 31 is a blazed grating, the second relief structure 32 may be an asymmetric grating such as a slanted grating. In still another scenario of another embodiment, when the first relief structure 31 is a slanted grating, the second relief structure 32 may be an asymmetric grating such as a blazed grating. In still another scenario of another embodiment, a material of the second relief structure 32 may alternatively be another material other than titanium dioxide, and a refractive index of the second relief structure 32 may alternatively be greater than 2.8. The second relief structure 32 may be formed by a dry etching process, or may be formed by a nano-imprint process. In still another scenario of another embodiment, a period, a height, and a duty cycle of the second relief structure 32 may be different from a period, a height, and a duty cycle of the first relief structure 31 respectively.

In another embodiment, the method for manufacturing the composite grating 30 may further include forming a third relief structure on a side of the second relief structure 32 that faces away from the first relief structure 31. There may be one or more third relief structures, and the third relief structure may be a blazed grating or a slanted grating. A material of the third relief structure may be nano-imprint-lithography resist, titanium dioxide, or another material. A refractive index of the third relief structure is 1.5 to 2.8 (including 1.5 and 2.8), or a refractive index of the third relief structure may be greater than 2.8. The period, the height, and the duty cycle of the third relief structure may be the same as or different from the period, the height, and the duty cycle of the first relief structure 31 (or the second relief structure 32) respectively.

The protection scope of this application is not limited to all the foregoing listed embodiments. An embodiment formed by any combination of different embodiments also falls within the protection scope of this application. That is, the plurality of embodiments described above may also be any combination according to an actual requirement.

The foregoing are merely some embodiments and implementations of this application, and the protection scope of this application is not limited thereto. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A composite grating, comprising:
a first relief structure defining a plurality of first slits; and
a second relief structure defining a plurality of second slits, wherein the second relief structure is stacked on a light incident side of the first relief structure, a widest part of each second slit is a side of the respective second slit that faces away from the first relief structure, a surface of the first relief structure that faces away from the second relief structure is a reference plane, wherein an included angle between a projection, on the reference plane, of an extension direction of a first slit of the plurality of first slits and a projection, on the reference plane, of an extension direction of a second slit of the plurality of second slits is 45 degrees to 60 degrees, the extension direction of the first slit is parallel to the reference plane, a profile of the first slit is symmetric along the extension direction of the first slit, the extension direction of the second slit is parallel to the reference plane, and a profile of the second slit is symmetric along the extension direction of the second slit.

2. The composite grating according to claim 1, wherein the second relief structure is partially embedded in the plurality of first slits.

3. The composite grating according to claim 2, wherein a refractive index of the first relief structure and a refractive index of the second relief structure are between 1.5 and 2.8, and the refractive index of the first relief structure is greater than the refractive index of the second relief structure.

4. The composite grating according to claim 1, wherein the composite grating further comprises an intermediate layer, wherein the intermediate layer is disposed between the first relief structure and the second relief structure, a refractive index of the first relief structure and a refractive index of the second relief structure are between 1.5 and 2.8, and a refractive index of the intermediate layer is less than the refractive index of the first relief structure.

5. The composite grating according to claim 1, wherein the first relief structure and the second relief structure each are an asymmetric grating.

6. The composite grating according to claim 5, wherein the first relief structure is a blazed grating or a slanted grating; or the second relief structure is a blazed grating or a slanted grating.

7. The composite grating according to claim 1, wherein a material of the first relief structure is nano-imprint-lithography resist or titanium dioxide; and/or a material of the second relief structure is nano-imprint-lithography resist or titanium dioxide.

8. The composite grating according to claim 1, wherein the composite grating further comprises an auxiliary layer, and the auxiliary layer is disposed on a side of the first relief structure that faces away from the second relief structure.

9. The composite grating according to claim 1, wherein the composite grating further comprises a substrate, and the substrate is located on the side of the first relief structure that faces away from the second relief structure.

10. The composite grating according to claim 1, wherein the composite grating further comprises a third relief structure, and the third relief structure is disposed on a side of the second relief structure that faces away from the first relief structure.

11. A diffraction optical waveguide, comprising:
a waveguide base; and
a composite grating, wherein the composite grating is installed on a surface of the waveguide base and forms an in-coupling grating and/or an out-coupling grating of the waveguide base, and the composite grating comprises:
a first relief structure defining a plurality of first slits; and
a second relief structure defining a plurality of second slits, wherein the second relief structure is stacked on a light incident side of the first relief structure, a widest part of each second slit is on a side of the respective second slit that faces away from the first relief structure, a surface of the first relief structure that faces away from the second relief structure is a reference plane, wherein an included angle between a projection, on the reference plane, of an extension direction of a first slit of the plurality of first slits and a projection, on the reference plane, of an extension direction of a second slit of the plurality of second slits is 45 degrees to 60 degrees, the extension direction of the first slit is parallel to the reference plane, a profile of the first slit is symmetric along the extension direction of the first slit, the extension direction of the second slit is parallel to the reference plane, and a profile of the second slit is symmetric along the extension direction of the second slit.

12. The diffraction optical waveguide according to claim 11, wherein the second relief structure is partially embedded in the plurality of first slits.

13. The diffraction optical waveguide according to claim 12, wherein a refractive index of the first relief structure and a refractive index of the second relief structure are between 1.5 and 2.8, and the refractive index of the first relief structure is greater than the refractive index of the second relief structure.

14. The diffraction optical waveguide according to claim 11, wherein the composite grating further comprises an intermediate layer, wherein the intermediate layer is disposed between the first relief structure and the second relief structure, a refractive index of the first relief structure and a refractive index of the second relief structure are between 1.5 and 2.8, and a refractive index of the intermediate layer is less than the refractive index of the first relief structure.

15. The diffraction optical waveguide according to claim 11, wherein the first relief structure and the second relief structure each are an asymmetric grating.

16. The diffraction optical waveguide according to claim 15, wherein the first relief structure is a blazed grating or a slanted grating; and/or the second relief structure is a blazed grating or a slanted grating.

17. The diffraction optical waveguide according to claim 11, wherein a material of the first relief structure is nano-imprint-lithography resist or titanium dioxide; or a material of the second relief structure is nano-imprint-lithography resist or titanium dioxide.

18. The diffraction optical waveguide according to claim 11, wherein the composite grating further comprises an auxiliary layer, the auxiliary layer is disposed on a side of the first relief structure that faces away from the second relief structure.

19. The composite grating according to claim 6, wherein the first relief structure is a blazed grating or a slanted grating, and the second relief structure is a blazed grating or a slanted grating.

20. The diffraction optical waveguide according to claim 17, wherein a material of the first relief structure is nano-imprint-lithography resist or titanium dioxide, and a material of the second relief structure is nano-imprint-lithography resist or titanium dioxide.

* * * * *